United States Patent
Bogaard et al.

(10) Patent No.: US 11,250,645 B2
(45) Date of Patent: Feb. 15, 2022

(54) COMMUNICATION SYSTEM FOR PARKING

(71) Applicant: Parkmobile USA, Atlanta, GA (US)

(72) Inventors: Albert Bogaard, Atlanta, GA (US); Jacek Sadkowski, Duluth, GA (US)

(73) Assignee: Parkmobile USA, Atlanta, GA (US)

( * ) Notice: Subject to any disclaimer, the term of this patent is extended or adjusted under 35 U.S.C. 154(b) by 1282 days.

(21) Appl. No.: 14/686,287

(22) Filed: Apr. 14, 2015

(65) Prior Publication Data
US 2015/0221139 A1 Aug. 6, 2015

Related U.S. Application Data

(63) Continuation of application No. 13/172,774, filed on Jun. 29, 2011, now abandoned.

(51) Int. Cl.
  *G07B 15/02* (2011.01)
  *G06Q 20/10* (2012.01)
  (Continued)

(52) U.S. Cl.
  CPC .............. *G07B 15/02* (2013.01); *B60L 53/60* (2019.02); *G06Q 10/02* (2013.01); *G06Q 20/102* (2013.01);
  (Continued)

(58) Field of Classification Search
  CPC .. G07B 15/02; G07B 15/063; G06Q 30/0284; G06Q 20/32; G06Q 10/02; G06Q 20/102; B60L 53/60; G08G 1/144; Y02T 90/12
  (Continued)

(56) References Cited

U.S. PATENT DOCUMENTS 8,025,526 B1 * 9/2011 Tormey ................. B60L 3/0069
  439/528
8,063,797 B1 * 11/2011 Sonnabend .............. G08G 1/04
  340/932.2
(Continued)

FOREIGN PATENT DOCUMENTS

FR 2820232 A1 8/2002
WO 0233676 A1 4/2002
WO 2007114585 A1 10/2007

OTHER PUBLICATIONS

Hansen, Lisa; "Mayor, Streetline, and City of LA Debut Parker for iPhone"; Targeted News Service [Washington, D.C.] Dec. 23, 2010 (Year: 2010).*

*Primary Examiner* — Michael P Harrington
*Assistant Examiner* — Brian A Tallman
(74) *Attorney, Agent, or Firm* — Dentons US LLP

(57) ABSTRACT

A communication network for parking comprises a server to process a payment transaction associated with a parking session and a selected parking related service; a mobile computing device interface for communications between the server and a mobile computing device over a wireless network including information one or more parking related services based on the parking identifier, a parking session, a user selected parking related service, authorization of the parking session and the selected parking related service, approval for a payment transaction, and an end condition associated with the parking session and the selected parking related service; a parking supplier interface for validation communications between the server and the parking supplier including information of the payment transaction between the parking supplier and a payment provider; and a communications link between the server, the mobile computing device, the parking supplier, the payment provider, and the memory.

10 Claims, 14 Drawing Sheets

(51) Int. Cl.
  *G08G 1/14* (2006.01)
  *G06Q 10/02* (2012.01)
  *B60L 53/60* (2019.01)
  *G06Q 30/02* (2012.01)
  *G06Q 20/32* (2012.01)
(52) U.S. Cl.
  CPC ......... *G06Q 30/0284* (2013.01); *G08G 1/144* (2013.01); *G06Q 20/32* (2013.01); *Y02T 90/12* (2013.01)
(58) Field of Classification Search
  USPC .......................................................... 705/13
  See application file for complete search history.

(56) References Cited

U.S. PATENT DOCUMENTS

| | | | |
|---|---|---|---|
| 8,554,651 B2 | 10/2013 | Rinne et al. | |
| 2005/0280555 A1 | 12/2005 | Warner | |
| 2006/0116892 A1* | 6/2006 | Grimes | G06Q 10/02 705/5 |
| 2006/0250278 A1* | 11/2006 | Tillotson | G08G 1/14 340/932.2 |
| 2007/0040701 A1* | 2/2007 | Browne | G08G 1/14 340/932.2 |
| 2008/0071611 A1* | 3/2008 | Lovett | G07B 15/02 705/13 |
| 2008/0114675 A1* | 5/2008 | Ward | G06Q 20/127 705/323 |
| 2008/0319837 A1* | 12/2008 | Mitschele | G07F 9/002 705/13 |
| 2009/0109062 A1* | 4/2009 | An | G06Q 20/04 340/932.2 |
| 2009/0125341 A1* | 5/2009 | Somoza | G06Q 10/02 705/5 |
| 2010/0090865 A1* | 4/2010 | Dasgupta | G08G 1/14 340/932.2 |
| 2010/0134067 A1* | 6/2010 | Baxter | B60L 3/12 320/109 |
| 2011/0011930 A1 | 1/2011 | Starr et al. | |
| 2011/0022427 A1 | 1/2011 | Dayan | |
| 2011/0093314 A1* | 4/2011 | Redmann | G06Q 20/14 705/13 |
| 2011/0127944 A1 | 6/2011 | Saito et al. | |
| 2011/0145141 A1 | 6/2011 | Blain | |
| 2012/0173292 A1* | 7/2012 | Solomon | G06Q 50/30 705/5 |

* cited by examiner

COMMUNICATION SYSTEM FOR PARKING

This application is a continuation of and claims priority to U.S. application Ser. No. 13/172,774, filed on Jun. 29, 2011, which claims priority to U.S. application Ser. No. 12/949,647, filed Nov. 18, 2010, all of which are incorporated by reference in their entirety for all purposes as if fully set forth herein.

FIELD OF THE DISCLOSURE

This disclosure relates generally to the parking field, and more specifically to an improved and useful system for communication of a parking session and/or parking related services.

BACKGROUND

In conventional systems of on-street parking, off-street parking (nongated and gated), and controlled zoned parking, user payment for the use of parking spaces is required. Examples include street meters, parking lots and garages. Typically, these payments are limited to cash or coin payments. Unfortunately, many users oftentimes don't have the correct denomination of cash to pay for the parking session, or may consider the payment process too time-consuming (e.g. too much time waiting in line or looking for change), leading to noncompliance wherein the user simply does not pay for the use of the parking space. This noncompliance causes the parking suppliers to pay for more parking enforcement to cite the noncompliant users, which can be costly for the parking suppliers and inconvenient for the users. Additionally, because users must pay for the parking beforehand, users may pay for more parking than necessary, which is not cost efficient for the user. The conventional parking payment system is inefficient for the parking providers as well, as they need to pay for personnel to enforce parking payment. Additionally, keeping the parking payments "on street" (e.g. in pay boxes or meters) often leads to shrinkage and loss of revenue.

Conventional systems have tried to address these issues by offering prepay services, wherein the user pays in advance for an account from which parking payments are deducted as the user utilizes the parking spots. However, such prepay systems have several drawbacks. For example, these systems may be inconvenient because the user periodically needs to remember to refill the prepaid account, which may be a burdensome process. Additionally, the user may need to carry additional equipment, such as a card or device that allows them to pay for the parking.

Other conventional systems have attempted to address these issues by incorporating parking space identifiers in lieu of the parking meter, wherein users may remotely pay for the parking spot by using their mobile phone. For example, as described in U.S. Pub. No. 2006/0116892, which is hereby incorporated in its entirety by this reference, a placard or sign may be placed on the meter near the parking space with a phone number that the user may call. After the call is placed, the user may then enter a parking identifier into their phone and proceed to pay for the parking spot. These parking payment systems are time-consuming, as the user must take the time to place a call, wait for the call to be connected, then enter the parking information. Additionally, these systems may be costly for the user, as users may pay for each minute they are connected to a call; with these systems, not only does the user need to pay for the parking, but they must also pay for the minutes used during the call (and hope that they remain connected for the entirety of the phone call). Such parking payment systems may also require the refitting of the parking meters or payment kiosks to accept the payment, adding inconvenient capital equipment costs to the parking provider.

Thus, there is a need in the parking payment field to create an improved and useful method of processing a transaction for a parking session.

SUMMARY

The present invention provides for the processing of a parking session and ancillary, parking related services. In accordance with one aspect of the invention A communication network for parking comprises a server to process a payment transaction associated with a parking session and a selected parking related service; a mobile computing device interface for user communications between the server and a mobile computing device over a wireless network including information of a user identifier, a parking identifier, one or more parking related services based on the parking identifier, a parking session, a user selected parking related service, authorization of the parking session and the selected parking related service, approval for a payment transaction, and an end condition associated with the parking session and the selected parking related service; a parking supplier interface for validation communications between the server and the parking supplier including information of the payment transaction between the parking supplier and a payment provider; a memory for provider communications with the server for storing information of the parking supplier based on the parking identifier and payment information based on the user identifier; and a communications link between the server, the mobile computing device, the parking supplier, the payment provider, and the memory to provide parking session and parking related service information to a user via the mobile computing device, receive location data by the server from the mobile computing device, identify a user selected parking related service, authorize the parking session and selected parking related service, approve the payment transaction, and process the payment transaction, wherein the server, after authorizing the parking session, accesses parking information corresponding to the user identifier, the parking identifier, the parking session, the user selected parking related service, and the parking supplier and computes one amount for the payment transaction covering the cost of both the parking session and the selected parking related service, and wherein the cost of the parking session is based on a duration of time between the authorization of the parking session and the determination that an end condition associated with the parking session has occurred and a location of a parking space associated with the parking session.

In accordance with another aspect of the invention, the aforementioned problems associated with the prior art are overcome by a method of processing a payment transaction associated with a parking session and one or more parking related services, where the payment transaction is between a parking supplier and a payment provider on behalf of a user. The method involves receiving a first signal over a wireless network from a mobile computing device, where the first signal conveys a user identifier and a parking identifier. The method then involves retrieving parking supplier information stored in a memory based on the parking identifier, retrieving payment provider information stored in the memory based on the user identifier, and processing the transaction between the payment provider and the parking supplier. The cost of the transaction is based on a parking session duration and a selected one of the one or more parking related services.

In accordance with another aspect of the invention, the aforementioned problems associated with the prior art are overcome by a method of processing a payment transaction associated with a parking space reservation services. The payment transaction is between a parking supplier and a payment provider on behalf of a user. The method comprises, among other things, receiving a first signal over a wireless network from a mobile computing device, where the first received signal conveys location information associated with the mobile computing device. The method then involves accessing information stored in memory, where the stored information identifies a number of available parking locations that are within a set distance from the location of the mobile computing device. Next, the method involves transmitting a first signal over the wireless network to the mobile computing device, where the first transmitted signal conveys the available parking locations that are within a set distance from the location of the mobile computing device, and receiving a second signal over the wireless network from the mobile computing device, where the second received signal conveys a reservation request for a selected one of the available parking locations. Thereafter, the method involves processing the payment transaction between the payment provider and the parking supplier, where the cost associated with the transaction is based on a parking session duration at the selected one of the available parking locations.

BRIEF DESCRIPTION OF THE DRAWINGS

Several figures are provided herein to further the explanation of the present invention. More specifically.

DETAILED DESCRIPTION

The following description of the preferred embodiments of the invention is not intended to limit the invention to these preferred embodiments, but rather to enable any person skilled in the art to make and use this invention.

Figure 1:
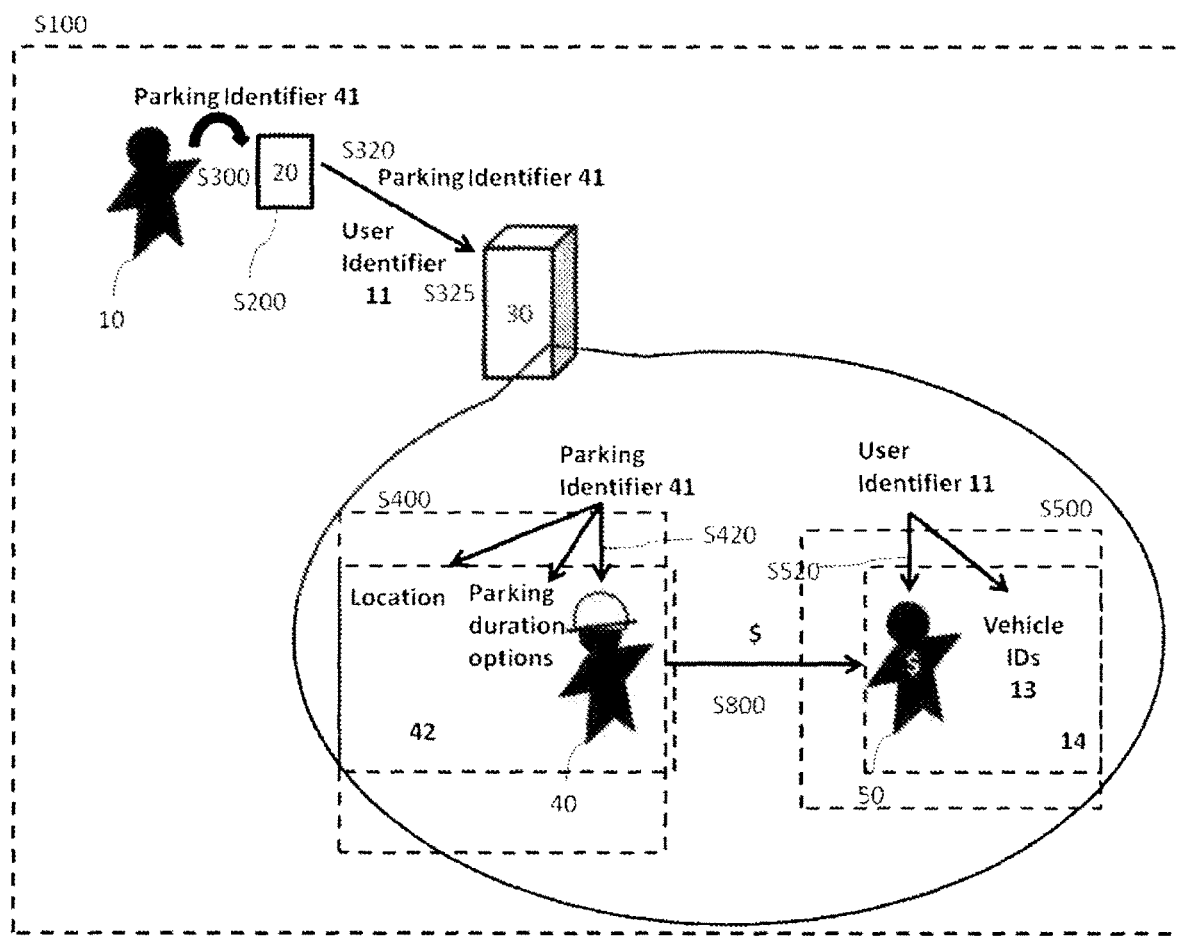
FIG. 1 is a schematic representation of the parking payment method.

As shown in FIG. 1, the preferred embodiments of the invention include a method S100 of processing a transaction for a parking session between a parking supplier and a payment provider on behalf of a user 10, wherein the user 10 facilitates the transaction through a mobile computing device 20 connected to a remote server 30. The method S100 includes, on the mobile computing device 20 of the user 10, the steps of: storing a user identifier S200; first receiving a parking identifier S300, then sending the user identifier and the parking identifier to the server S320. The method S100 also includes, on the remote server 30, the steps of: receiving the user identifier and the parking identifier S325; retrieving parking information based on the parking identifier S400; retrieving user information based on the user identifier S500; and processing a transaction between the payment provider and parking supplier S800.

This method S100 is faster and more convenient than conventional methods for several reasons. First, this method S100 allows the parking transaction to be accomplished without an actual phone call, eliminating the costs and inconveniences associated with making a phone call. Second, most of the user-specific information 14 necessary for the user 10 to obtain parking (e.g. the user identifier 11 and/or vehicle identifier 13) may be stored on the mobile computing device 20, so the user 10 does not have to spend time re-entering the information each time they pay for parking. Third, because the majority of parking-relevant information (e.g. the user identifier 11 and/or parking identifier 41) is gathered before the mobile computing device 20 connects to the server 30, multiple pieces of information may be sent to the server 30 in substantially one step instead of sending single pieces of information in a series of substantially temporally distinct steps. Because multiple pieces of information may be sent in a set of data packets, this method S100 may additionally connect to the server 30 faster than prior art systems if the connection prioritizes data transfer over voice calls, which may be particularly pertinent if in an area with a lot of mobile device traffic (e.g. in San Francisco or a sold-out concert). Furthermore, because this method S100 only requires the mobile computing device 20 of the user, this method S100 may be less expensive for the user 10, as the user 10 needs only to pay for several packets of data instead of several minutes of a phone call, and does not need to purchase any additional equipment. This method S100 may be less expensive for parking suppliers 40 as well, because minimal parking infrastructure changes need to be implemented—instead of having to refit the parking areas with new parking equipment (e.g. parking meters or kiosks, as in conventional systems), the parking suppliers 40 may only need to add a parking identifier 41 to the existing equipment. Additionally, with this method S100, more users 10 may pay for parking because it is more convenient to do so. For example, this method S100 allows mass transit users to park, get on the train, bus, ferry, etc., then complete their parking transaction from their seat, allowing the users to successfully board the mass transit vehicle and still pay for parking. This method S100 also reduces the need for parking providers to pay for parking reinforcement and towing services. This method also allows parking providers to retain revenue and prevent shrinkage, as the payments are no longer kept "on-street." The method S100 may also reduce transactional costs by lumping together transactions for multiple parking sessions, such that one authentication and transaction may be performed for several parking sessions at once instead of performing them for every parking session.

The entities that may be involved with the method include the users, the parking providers, and the payment providers. The users 10 are people who desire to leave a vehicle 12 in a parking space for a period of time. The vehicle 12 is preferably a car, but may alternatively be a bicycle, a motorcycle, a boat, or any suitable conveyance that is steered or operated by a person and transports items. The parking providers of this method S100 are preferably municipalities, but may alternatively be private operators, stadiums, event venues, universities, hospitals, airports, Mass Transit Authorities or any other entity that requests payment for parking. The payment providers 50 of this method S100 function to pay the parking fee on behalf of the user 10, and are preferably credit card companies, but may alternatively be a bank, an e-commerce payment service (e.g. PayPal), a mutual fund, or any other source of liquid assets with whom the user 10 has an account. The payment provider 50 may alternatively be a business entity affiliated with the user 10. The account the user 10 has with the payment provider 50 is preferably a credit account, but may alternatively be a debit account, a stored value account, or an online account.

The method is preferably used by the user 10 to pay for one or more parking sessions. The parking session is the duration of time that a user 10 leaves a vehicle 12 in a parking spot, and is characterized by a start time 72 and an end time 74, wherein the parking duration 70 is the amount of time elapsed between the start time 72 and the end time 74. The parking duration is preferably calculated as the difference between the start time and the end time, but may alternatively be directly measured by a timer started at the start time and ended at the end time. The parking session (and therefore, the start and end times) is preferably recorded on the server 30, but may alternatively be recorded on the mobile computing device 20. The start time 72 of the parking session is preferably determined from the time a start condition is met, and the end time 74 is preferably determined from the time an end condition is met. The start and end times are preferably time stamps, and preferably include the date, hour and minute of the start and end times. The parking session is preferably a start duration parking session, wherein the parking duration 70 of the parking session is preferably defined by the user 10 at the start time 72 (e.g. for metered parking or pre-paid street parking). A start duration parking session is analogous to metered parking, wherein the parking duration 70 in a specific parking spot is determined at the start of the parking session, and the user 10 pays for the desired parking duration at the onset of the parking action. The parking duration 70 of the start duration parking session may additionally be extended by additional time blocks up to a maximum parking duration (preferably set by the parking supplier 40). The parking session may alternatively be a start-stop parking session, wherein the parking duration is preferably undefined until the user 10 ends the parking session (e.g. airport parking, private parking lots). The start-stop parking session may also be subject to parking restrictions (e.g. the maximum parking duration is 3 hours), preferably set by the parking supplier, wherein the meeting of the parking restriction ends the parking session. A start-stop session parking session is analogous to airport parking, wherein there is no maximum parking duration (the user 10 may park as long as they wish), and the user 10 pays for the parking duration 70 after the parking session has been explicitly ended by the user 10, or a maximum parking time allowed set by supplier 40 is reached. The user 10 and parking supplier 40 are preferably allowed access to information about current and past parking sessions that they are affiliated with. For example, the user may check the parking duration on any of their current or past parking sessions, or the parking supplier may access the vehicle identifiers associated with their current parking sessions during parking enforcement.

Figure 2:
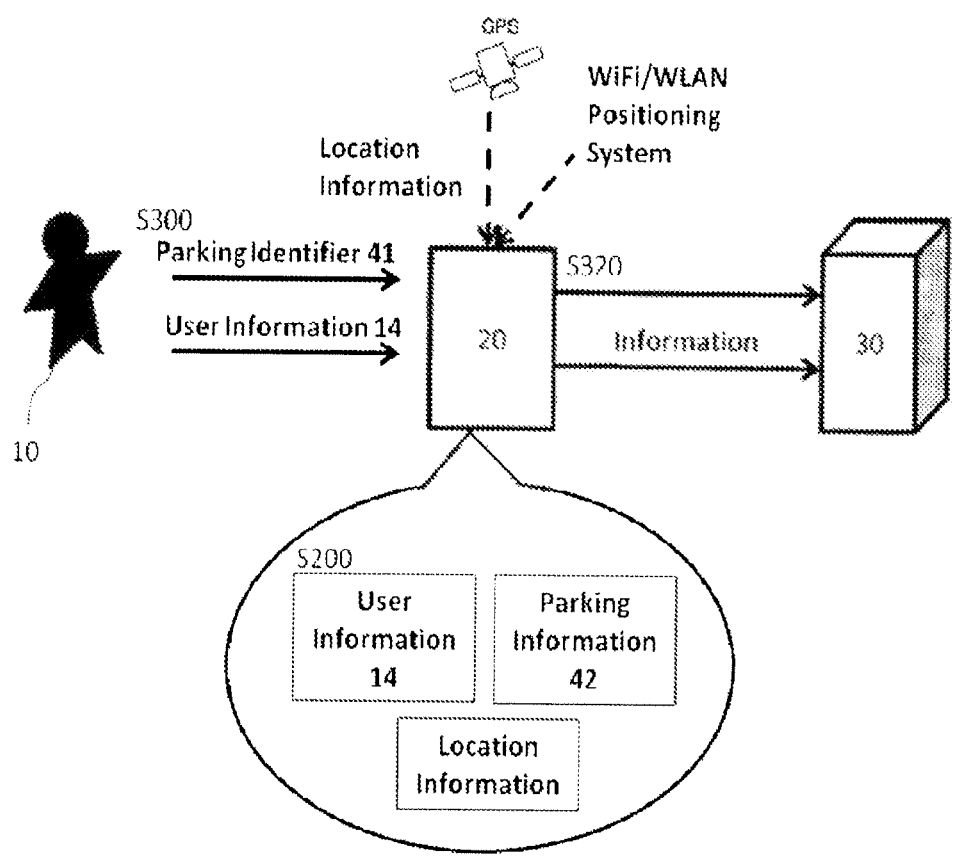
FIG. 2 is a schematic representation of the functions of the mobile computing device.

As shown in FIG. 2, the mobile computing device 20 functions to provide an interface between the user 10 and the server 30 and, more specifically, to receive data from the user 10 and send the data to the server 30. The mobile computing device 20 may additionally function to store user information 14 received from the user 10 as well to gather user and location information. The mobile computing device 20 is preferably a smart phone (e.g. iPhone, Android, Blackberry, Windows Mobile or any other mobile computing technology platforms), but may alternately be a laptop, a tablet, or any suitable mobile computing device 20 that is capable of saving data, accessing data, and connecting to the server 30. The mobile computing device 20 may additionally include a camera, a barcode scanner, or a RF receiver. The mobile computing device 20 is preferably connected to the server 30 through telecommunication, more preferably through mobile wireless communication such as the services provided by Verizon, AT&T or Sprint (e.g. GSM or CMDA), but may alternately be any mobile wireless communication. The mobile computing device 20 may also connect to the server 30 through an internet service such as broadband, Wi-Fi, WiMax, LTE or any other internet computing technology, wherein the mobile computing device 20 preferably connects to the server 30 wirelessly, but may alternately be wired to the server 30. The mobile computing device 20 may also connect to the server 30 through a satellite connection, radio connection or any other connection that permits data transfer. The mobile computing device 20 may include multiple methods of connecting to the server, and may choose a preferred data transfer channel based on availability and actual signal strength and/or bandwidth availability. The interface provided by the mobile device is preferably a graphical user interface (GUI) with an application programming interface (API), but may alternatively be a web browser, a text box, or a button. User information 14 stored on the mobile computing device 20 may include the user identifier 11, a user password, vehicle identifiers 13 for the user's vehicles, payment provider information 52, or any other information that is associated with the user 10. Other information that may be stored on the mobile computing device 20 include parking information 42, wherein frequented parking identifiers 41 are stored, or the user's parking session history. The mobile computing device may additionally gather and store location information, wherein the location information is gathered by a global positioning system (GPS), a WiFi or WLAN positioning system (e.g. SkyHook technology) or a cellular tower positioning system, location images received from the user 10, or a location identifier (e.g. an address) received from the user 10.

Figure 3:
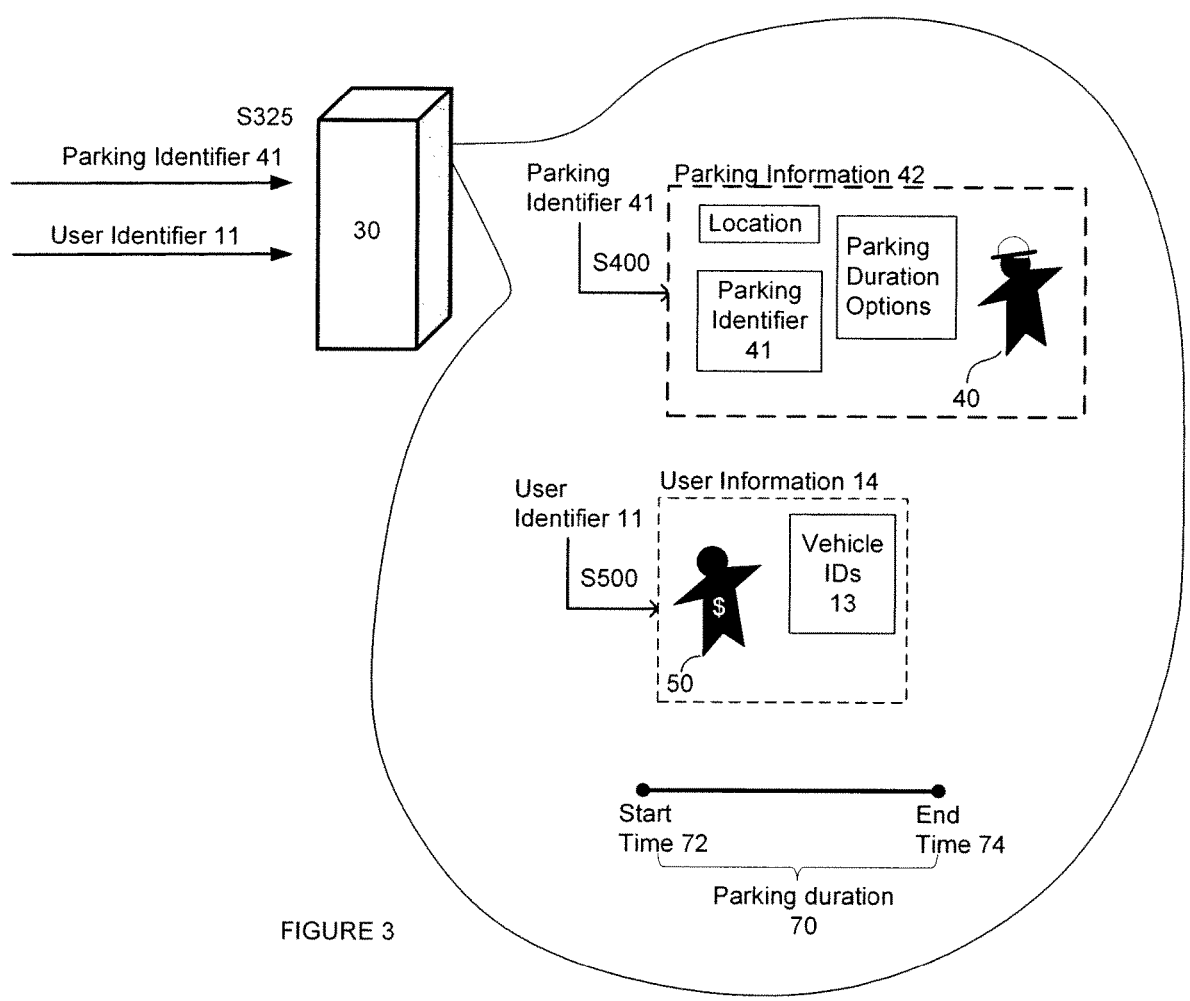
FIG. 3 is a schematic representation of the functions of the server.

As shown in FIG. 3, the server 30 functions to receive data sent by the mobile computing device 20, to store user 10 and parking information 42, to validate received data against stored data, and to process transactions between the parking supplier 40 and payment provider 50. The server 30 may additionally function to store parking session data including the start time 72, the end time 74, the cost of the parking session, an identifier for the parking provider, and an identifier for the user 11 utilizing the parking session. The server 30 may additionally send data such as notifications or a list of options to the mobile computing device 20, or send data to the parking supplier 40 or payment provider 50. The server 30 may additionally be accessible by the user 10, parking supplier 40 or payment provider 50, wherein the aforementioned entities may access and edit the data within their respective accounts. The user information 14 stored by the server 30 includes the user identifier 11, the user's password, the user's payment provider account(s), one or more vehicle identifiers 13 associated with vehicle information, and a history of the user's prior parking sessions. The parking information 42 stored by the server 30 includes the parking supplier 40 identifier, a parking location, a parking space identifier (the parking identifier 41), parking options (type of parking, time tables and rates, such as, but not limited to: maximum parking time, parking duration options 45 available), pricing information, and a history of prior parking sessions associated with the parking space. The vehicle information stored by the server 30 may include the license plate number, the vehicle identification number (VIN), the registration number, a barcode, images of the vehicle identifier 13, a text description of the vehicle 12, or any other pieces of information that may uniquely identify the vehicle 12. Validation of data on the server 30 includes successfully retrieving associated user 10 or parking information 42 based on a provided user 10 or parking identifier 41. Validation may additionally include verifying the authenticity of the user 10 based on a received password or verifying the proximity of the user 10 to the identified parking space based on received location information.

Figure 4:
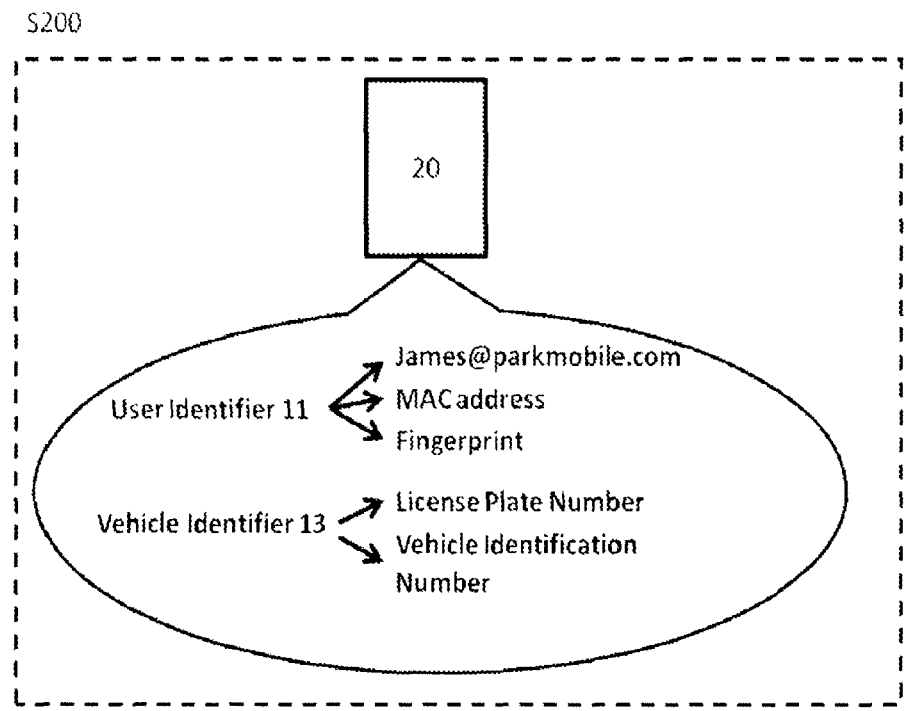
FIG. 4 is a schematic representation of the step of storing user information on the mobile computing device.

As shown in FIG. 4, the step of storing a user identifier on the mobile computing device S200 functions to allow the mobile computing device 20 to access the user identifier 11 without the user 10 having to enter the user identifier 11 each time the method S100 is used. The user identifier 11 is preferably electronically stored in the memory located in the mobile computing device 20, and is preferably stored when the user 10 registers to use the system. The user identifier 11 functions to identify a user 10 of the system, and is associated with the user information 14 on the server 30. The user identifier 11 is unique to the user 10, and is preferably a username such as an email address or a user-generated alphanumeric code, but may an identifier unique to the mobile computing device 20 (e.g. the mobile computing device's MAC address, IMEI identifier, or serial number), the user's telephone number, a physiological biometric (e.g. an image of a fingerprint or an eye), or a vehicle identifier 13 identifier associated with the user 10. The user identifier 11 is preferably associated with a user-defined password, but may alternatively have no associated password.

Figure 5:
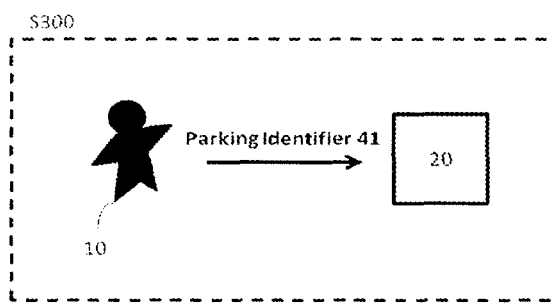
FIG. 5 is a schematic representation of the mobile computing device receiving a parking identifier.

As shown in FIG. 5, the step of first receiving a parking identifier by the mobile computing device S300 functions to provide an identifier for the parking space in which the user 10 wishes to park to the system. The parking identifier 41 is preferably received by the mobile computing device 20 from user 10 input, but may alternatively be received through a wireless signal, such as a RF or Bluetooth. The user 10 preferably inputs the parking identifier 41 by typing it into the mobile computing device 20, but may alternately input the parking identifier 41 by taking a photo, scanning an image, prompting the mobile computing device 20 to gather location data, or speaking near the mobile computing device 20. The parking identifier 41 may alternately not be received from the user 10, but instead be generated by the mobile computing device 20 in response to a user action, for example in the case of pulling the user location with the API. The parking identifier 41 functions to identify the associated parking information 42 stored on the server 30, and is preferably received by the mobile computing device 20 from the user 10. The parking identifier 41 is preferably unique to the parking space, but may alternately be non-unique, wherein multiple parking spaces share the same parking identifier 41. In the latter case, the parking spaces are preferably located in different zones (e.g. one is in California while the other is in Arizona). The parking spaces are preferably parking spots large enough to fit substantially one vehicle 12 (e.g. a parking spot in metered parking), but may comprise of a zone containing multiple parking spots and capable of accommodating many vehicles 12 (e.g. a parking lot). The parking identifier 41 is preferably an alphanumeric code, but may alternatively be an image (e.g. a barcode or a QR code), data encoded in a wireless signal (e.g. RF signal, Bluetooth signal), or a location pulled by the API. The parking identifier 41 is preferably displayed on or near a parking space in the form of a sticker or a sign, but may alternatively be a signal transmitter located on or near the parking space or be the determined location of the parking space.

Figure 6:
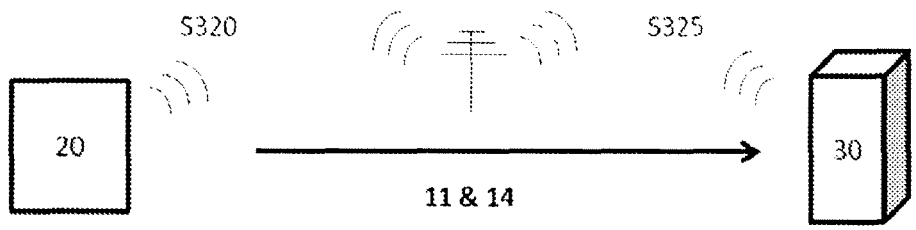
FIG. 6 is a schematic representation of the mobile computing device sending information to the server and the server receiving the information.

As shown in FIG. 6, the steps of then sending the user identifier and the parking identifier to the server by the mobile computing device S320 (and the corresponding step of receiving the user identifier and the parking identifier by the server S325) functions to provide user 10 and parking space-identifiers 41 to the server 30. This step occurs after the step of receiving the parking identifier by the mobile computing device S300. This step is preferably automatic, wherein reception of the parking identifier 41 by the mobile computing device 20 automatically prompts the mobile computing device 20 to send the user 10 and parking identifier 41 to the server 30. The identifiers are preferably sent via a data channel provided through a mobile communication network, but may alternatively be sent through an internet provider, a radio channel, satellite or any other channel that allows for data transfer.

Figure 7:
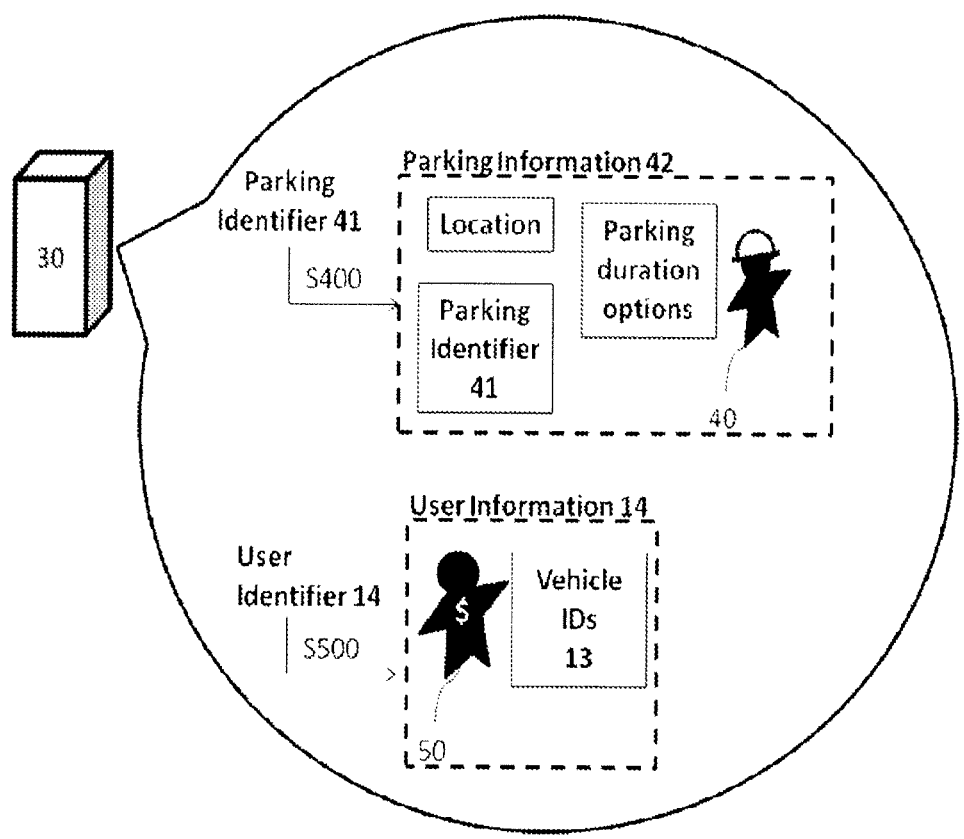
FIG. 7 is a schematic representation of the server retrieving parking information and retrieving user information.

As shown in FIG. 7, the steps of retrieving parking information based on the parking identifier S400 and retrieving user information based on the user identifier S500, function to provide the necessary information for the processing of the transaction for the parking session. The user information 14 is preferably retrieved first to ensure that the method S100 is being performed for a registered user 10 of the system, but the parking information 42 may alternately be retrieved first. Successful retrieval of the information qualifies as verification of the identifiers. Both the user 10 and parking information 42 are preferably retrieved from the server 30 by searching the server 30 database for the user 10 and parking identifier 41s, then retrieving the information associated with the identifiers. User information 14 that is preferably retrieved includes vehicle information and the payment provider information 52, but other user-related information may additionally be retrieved, such as the type of user account (e.g. business vs. individual). The vehicle information is preferably retrieved because it is preferably associated with the parking session, such that parking enforcement may identify the user's vehicle 12. The payment provider information 52 is preferably retrieved because it is used to pay for the parking session. Parking information 42 that is preferably retrieved includes the parking duration options 45, pricing information, and parking supplier information 47, but may additionally include the location of the parking space, the demand for the parking space, or any other information associated with the parking space. Parking duration options preferably include the time blocks available for the user to pre-purchase (e.g. 15 min, 30 min, 1 hr), but may alternately or additionally include the time interval/unit increments that may be paid for (e.g. user must pay for every 15 minute increment) or any parking restrictions that may be set by the parking supplier (e.g. maximum parking time, times and days when parking is not allowable). Parking duration options 45 are preferably retrieved because different use cases of the method S100 may have different parking durations 70 available. For example, in a start duration session, the user 10 may park in the parking space for a limited time, and multiple time blocks (e.g. 15 minutes) up to a maximum session duration (e.g. 2 hours) are typically available to the user 10, wherein the parking duration 70 is the sum of time blocks selected by the user 10. In contrast, in a start-stop session (e.g. parking in an airport parking lot) wherein the user 10 may park in the parking space for as long as they wish, the parking duration 70 is determined from start time 72 and the end time 74 of the parking session.

Figure 8:
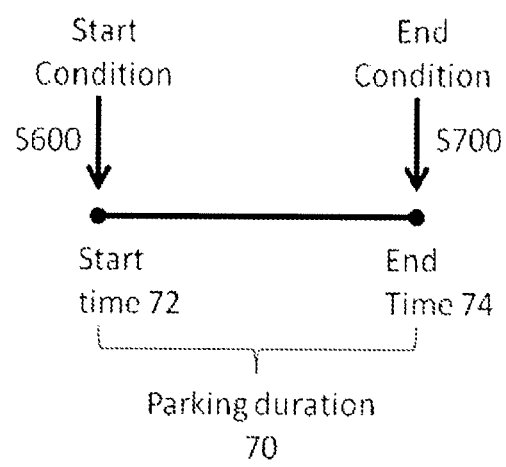
FIG. 8 is a schematic representation of meeting a start condition and meeting an end condition.

As shown in FIG. 8, the step of meeting a start condition S600 functions to notify the system that a parking session has commenced. The start condition is preferably the receipt of a start notification by the system from the user 10, wherein the start notification may be the selection of an option (e.g. selection of a "start parking" option or selection of a parking duration 70), the opening of an application, the receipt of a password, or any other notification indicating that a user 10 intends to start paying for parking. Alternately, the start condition may be the successful verification of the user identifier 11 and the parking identifier 41 by the server 30, wherein user information 14 is successfully retrieved using the user identifier 11, and unique parking information 42 is successfully retrieved using the parking identifier 41. The start condition is preferably the receipt of a start notification by the server 30, but may alternatively be the receipt of a start notification by the mobile computing device 20.

As shown in FIG. 8, the step of meeting an end condition S700 functions to notify the system that a parking session has ended. The end condition is preferably the receipt of an end notification by the server 30, wherein the end notification may be the selection of an option (e.g. selection of an "end parking" option), the closing of an application, the receipt of a password, or any other notification indicating that a user 10 intends to end payment for parking. In this case, the end notification is preferably first received by the mobile computing device 20 and sent to the server 30, wherein the end condition is the receipt of the end notification by the server 30. Alternately, the end condition may be the meeting of a predetermined time or timestamp (e.g. the time recorded by the timer matches a predetermined parking duration 70, or the current time matches the predetermined end time). In this case, the end condition may automatically met by the server 30, wherein the server 30 is recording and tracking the parking session, or an end notification may be automatically sent to the server 30 by the mobile computing device 20. Pricing information is preferably retrieved using the parking identifier 41 in order to calculate the transaction amount (the amount owed to the parking supplier 40). The parking supplier information 47 is preferably retrieved in order to record a parking session associated with the parking supplier 40 as well as to know whom to pay for the use of the parking space. The parking information 42 is preferably set by the parking supplier 40, but may alternately be dynamically computed by the server 30 based on time of day, demand, or any other factor.

Figure 9:
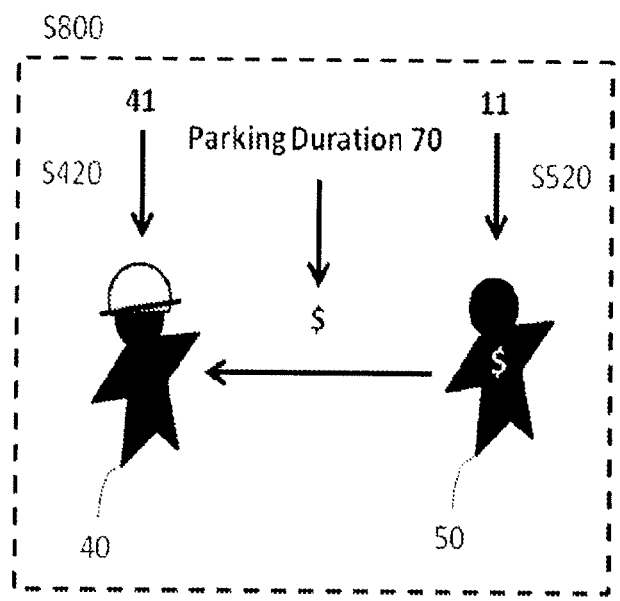
FIG. 9 is a schematic representation of processing a transaction between a payment provider and a parking supplier.

As shown in FIG. 9, the step of processing a transaction between the payment provider and the parking supplier, wherein the transaction amount is based on the duration of the parking session S800, functions to pay the parking supplier 40 for the use of the parking space on behalf of the user 10. The payment provider 50 and parking supplier information 47 are preferably retrieved by the server 30 based on the user identifier 11 and parking identifier 41, respectively. The payment is preferably determined from the parking duration 70 of the parking session, but may alternatively be a flat fee. The payment transaction is preferably processed at the end of the parking session, but may alternatively be processed at the beginning of the parking session or periodically during the parking session (e.g. in the start duration or the start-stop parking sessions, where the parking durations 70 may be extended). Alternately, the payment amounts owed to different parking providers may be accrued on the server 30 until a specified time (e.g. the end of the day or the 15th of the month), at which point one transaction with the total owed payment amount is processed, and a lump-sum payment is made by the payment provider 50 to the respective parking providers. The payment transaction is preferably processed by the server 30, but may alternately be processed by the mobile computing device 20.

Figure 10:
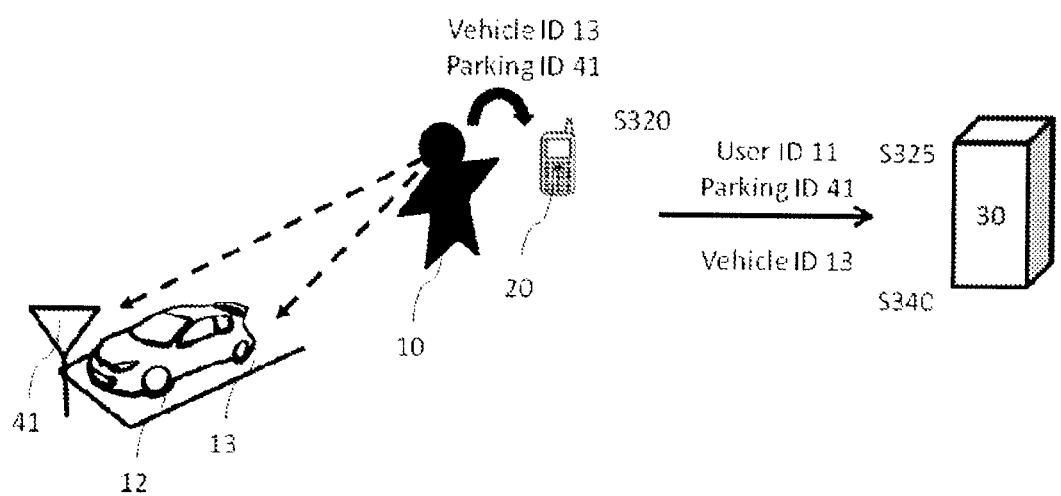
FIG. 10 is a schematic representation of receiving a vehicle identifier.

As shown in FIG. 10, the method S100 may additionally include the steps of receiving a vehicle identifier by the server S340. This step functions to allow the system to associate a vehicle identifier 13 with the parking session, and allows the parking supplier 40 to identify the vehicle identifier 13 as associated with a user 10 that has paid for parking. This step is preferably used when the user 10 has more than one vehicle 12 associated with the user identifier 11, but may alternately be used when the user has only one vehicle 12 associated with the user identifier 11. The vehicle identifier 13 is preferably used by the server 30 to retrieve and verify the vehicle information after the user information 14 is retrieved. Alternately, the vehicle identifier 13 may be used to retrieve the user information 14, especially if the vehicle identifier 13 is only associated with one user identifier 11. The vehicle identifier 13 is preferably unique to each vehicle 12, and is preferably associated with one user 10, but may also be associated with two users 10, three users 10, or any number of users 10. The vehicle identifier 13 is preferably an alphanumeric code, such as a license plate number, but may alternatively be the VIN number, the registration number, an image (e.g. of the license plate, or a unique scratch on the vehicle 12), a barcode, or any unique identifier of the vehicle 12. The vehicle identifier 13 is preferably located on the vehicle 12 during the parking session. The vehicle identifier 13 is preferably visible, but may alternately be invisible but still be detectable (e.g. the vehicle identifier 13 is a wireless signal transmitted by the vehicle 12).

As shown in FIG. 2, the method S100 may additionally include the step of receiving location data by the server from the mobile computing device S360, which functions to identify the parking space. This step is preferably accomplished by the mobile computing device 20 gathering location data and sending the location data to the server 30. The location data is preferably gathered by a global positioning system (GPS) of the mobile computing device 20, but may alternately be gathered by a WiFi or WLAN positioning system (e.g. SkyHook technology) or a cellular tower positioning system. The server 30 preferably uses the location data to identify the parking space, wherein the location data is the parking identifier 41, but may alternately use the location data to verify the parking space, as in the case of non-unique parking identifiers 41 or just to verify that the user 10 has entered the parking identifier 41 of the parking space they are parked in. This step preferably occurs with the step of receiving the user and parking identifiers by the server 30.

Figure 11:
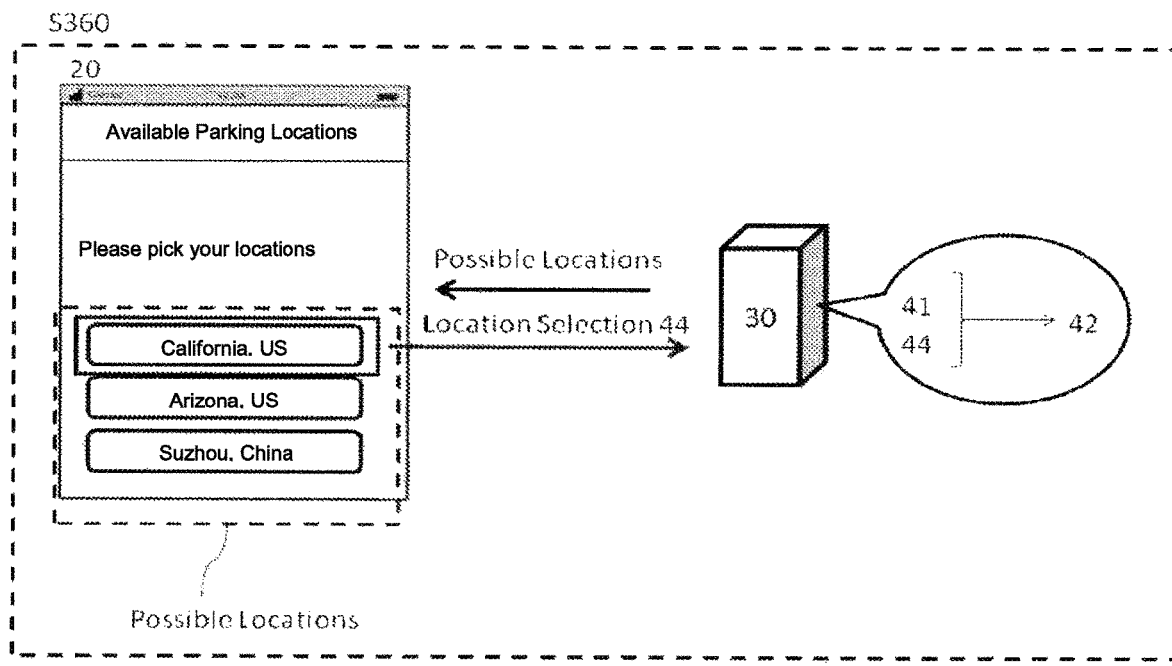
FIG. 11 is a schematic representation of receiving a parking location selection.

As shown in FIG. 11, the method S100 may additionally include the step of receiving a parking location selection by the server S360. This step is preferably used when the parking identifier 41 is non-unique to the parking space, and occurs when the server 30 is retrieving a unique set of parking information 42 based on the parking identifier 41. Due to the non-unique parking identifier 41, the server 30 will initially retrieve more than one set of parking information 42 associated with the parking identifier 41 after the parking identifier 41 is received by the server 30. In order to determine which unique parking space is being referenced (and subsequently, who to pay), the server 30 generates a set of possible locations by retrieving the location information from each of the parking information 42 sets and sending the set of possible locations to the mobile computing device 20, which displays the possible locations. The possible locations are preferably displayed as a list, but may be displayed as icons, a map, or any type of display that allows for a location selection 44. The possible locations are preferably substantially spatially separated, such as different countries, states, cities, or districts, but may be located substantially close to each other, such as two parking spots in the same parking lot. Upon the receipt of a location selection 44 from the user 10, the mobile computing device 20 sends the location selection 44 to the server 30, which retrieves a unique set of parking information 42 based on the parking identifier 41 and the location selection 44.

Figure 12:
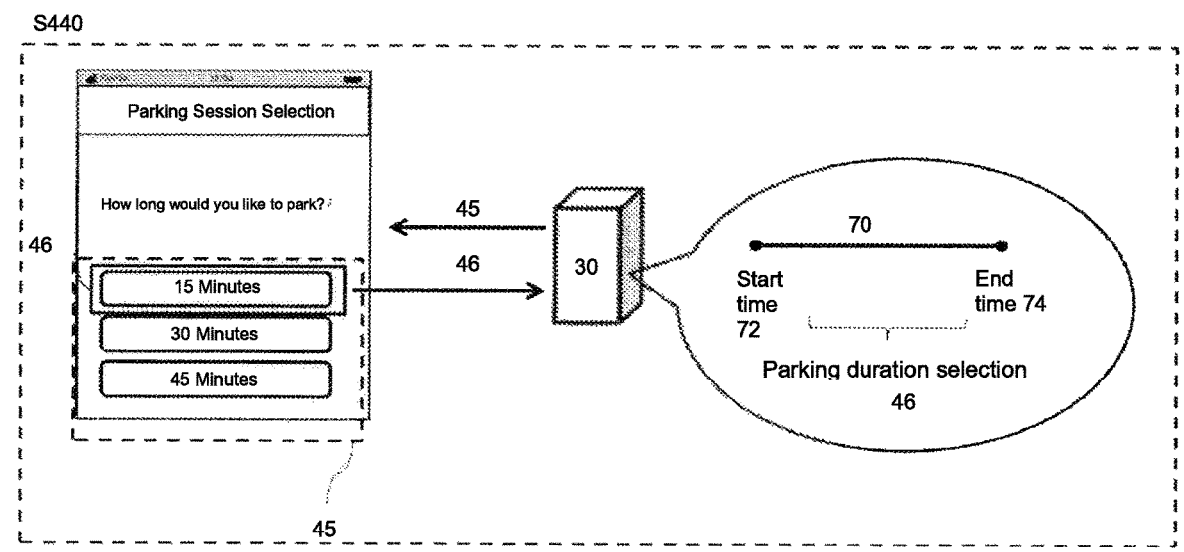
FIG. 12 is a schematic representation of receiving a parking duration selection.

As shown in FIG. 12, the method S100 may additionally include the step of receiving a parking duration selection by the server S440. This step preferably occurs after the user 10 and parking identifiers are verified, but before the parking session is begun. This step is preferably used when the parking session is a start duration session, (e.g. metered parking, pre-paid off-street parking) wherein a user selection of a parking duration 70 option (i.e. a time block, e.g. 15 minutes) is needed because the parking provider requires pre-payment for the parking duration 70. This step preferably comprises the steps of the server 30 retrieving the parking duration options 45 from the stored parking information 42 and sending the parking duration options 45 to the mobile computing device 20, wherein the mobile computing device 20: receives the parking duration options 45, displays the options, receives a parking duration selection 46, and sends the parking duration selection 46 to the server 30. The parking duration options 45 are preferably displayed as a list by the mobile computing device 20, but may alternately be icons, a timeline, or any type of display that allows for a parking duration selection 46. The parking duration options may alternately not be displayed, but be received from displayed entry fields that allow the user 10 to enter a desired amount of parking time (e.g. 5 min, 23 min, or one hour), wherein the entered parking time is less than the maximum parking time allowed for the parking identifier 41. The server 30 then sets an end time for the parking session based on the start time 72 and the parking duration selection 46, wherein the meeting of the end time is the end condition.

Figure 13:
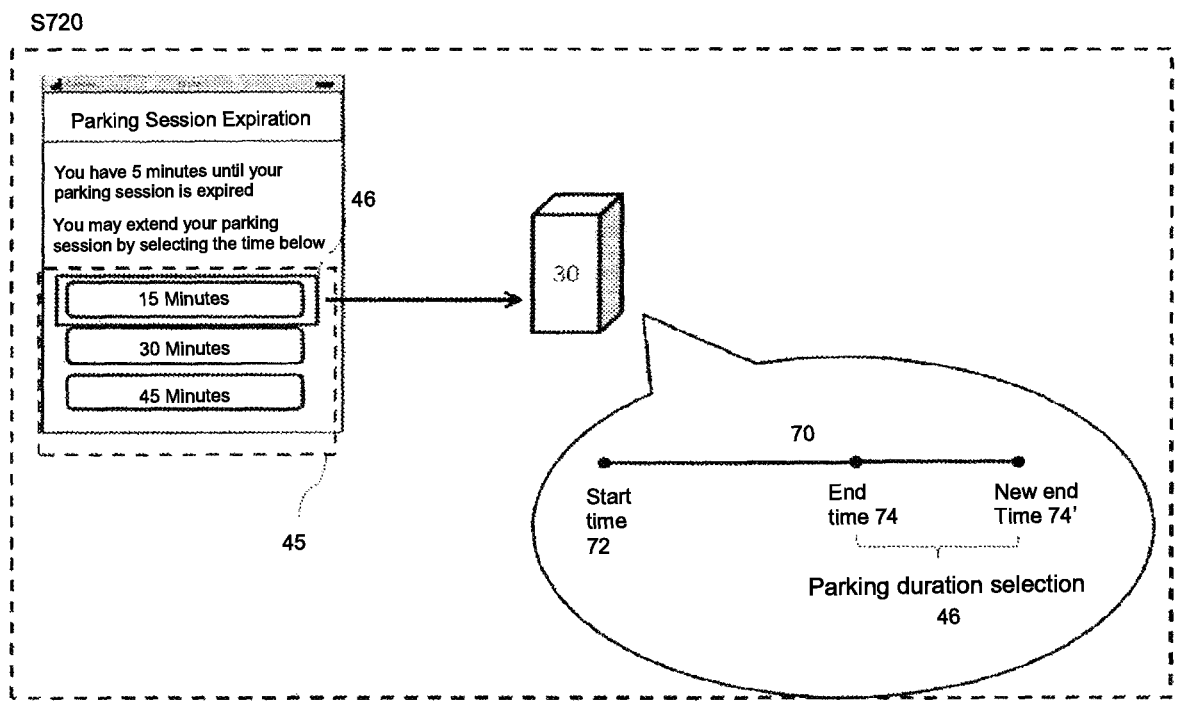
FIG. 13 is a schematic representation of displaying an expiration notification on the mobile computing device.

As shown in FIG. 13, the method S100 may additionally include the step of displaying an expiration notification on the mobile computing device S720, which functions to notify the user 10 of the imminent end of the parking session. The expiration notification is preferably sent near but before the end of the parking session, but may alternately be sent near the start of the parking session or anytime during the parking session. The expiration notification is preferably sent by the server 30 and received by the mobile computing device 20, but may alternately be generated by the mobile computing device 20. The expiration notification is preferably an SMS, but may alternately be a push notification, a MMS, email, or any type of notification that may be displayed on a mobile computing device 20. The expiration notification preferably informs the user 10 of the amount of time left to the parking session, but may alternately simply notify the user 10 that the parking session has almost or already ended. The expiration notification may additionally include parking duration extension options 45, wherein the user 10 may select a parking duration 70 extension to extend their parking duration 70. In this case, the mobile computing device 20 receives the parking duration extension selection 46 and the parking duration 70 is extended by the parking duration extension selection 46, either by the server 30 or the mobile computing device 20. This step is preferably used when the step of displaying the parking duration options 45 on the mobile computing device 20 is used.

Figure 14:
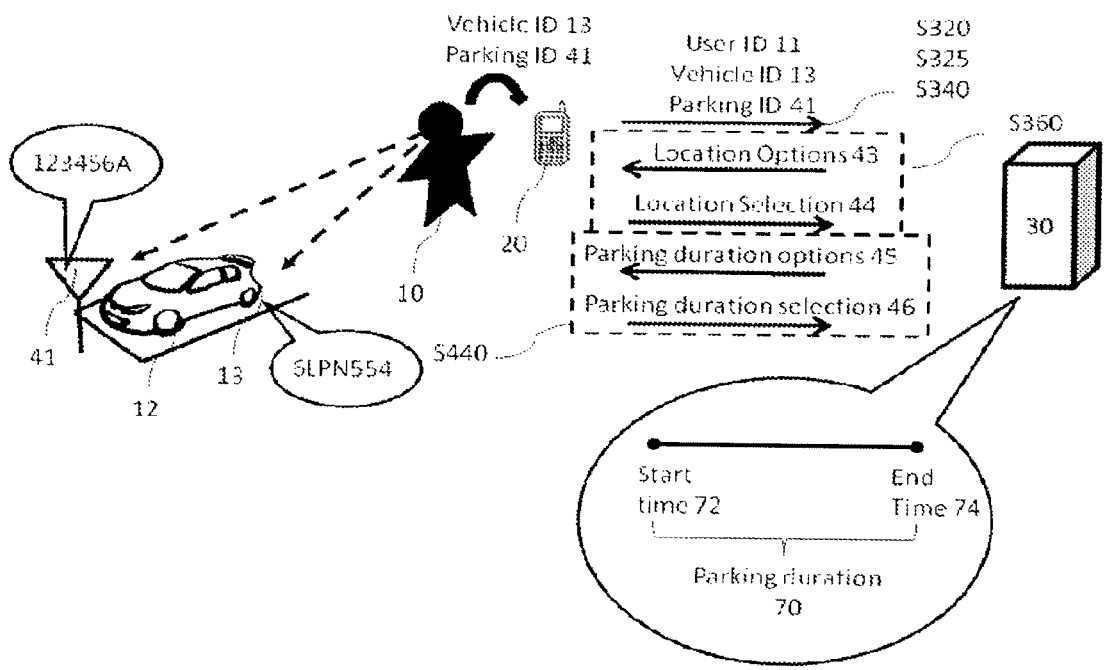
FIG. 14 is a schematic representation of a first embodiment of the parking payment method.

FIG. 14 shows a first exemplary implementation of the method S100, wherein the user 10 has multiple vehicles, the parking identifier 41 is a non-unique alphanumeric or numeric code posted on a meter, and the parking duration options 45 for the parking space is that of the start duration session, including any number of pre-paid time blocks (e.g. 15 min) up to a maximum parking time (e.g. 2 hours). Additionally, the start condition is the receipt of a parking duration selection 46 by the server 30, the end condition is the expiration of the parking duration 70, and the payment transaction is processed as soon as the parking duration selection 46 is made. Due to the multiple vehicles associated with the user 10, the step of receiving a vehicle identifier by the server S340 is used, wherein the vehicle identifier 13 is the license plate number. Due to the non-unique parking identifier 41, the step of receiving a parking location selection by the server S360 is used, wherein the parking spaces are located in two different cities, so the parking location options are those two cities. Due to the multiple parking duration options 45 available for the parking space, the step of receiving a parking duration selection by the server S440 is used, wherein the mobile computing device 20 displays the parking duration options 45 as a list. Upon the receipt of the parking duration selection 46, the start condition is met and the parking session is started, wherein the server 30 records a start time 72 and an end time 74, wherein the end time 74 is determined from the start time 72 and the parking duration selection 46. Because the parking duration 70 is known, the server 30 processes the payment transaction after the start of the parking session. In a variation of this exemplary implementation, the method S100 incorporates the step of displaying an expiration notification on the mobile computing device S720. The expiration notification is a notification generated by the mobile computing device 20, and includes parking duration options 45 available to the user 10 to extend their parking session.

Figure 15:
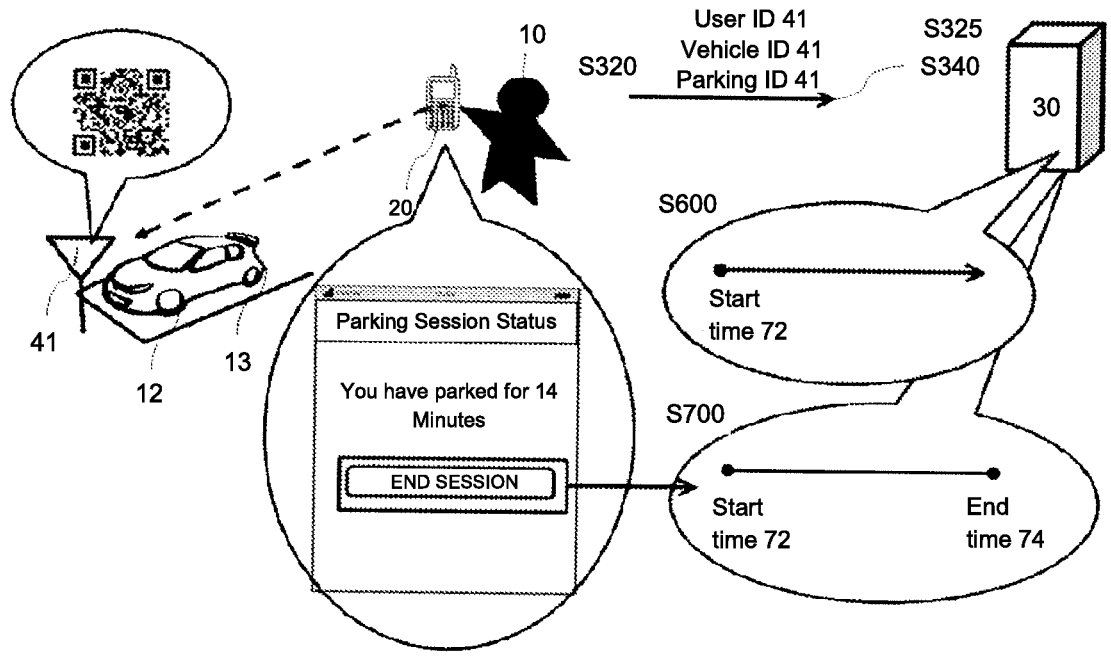
FIG. 15 is a schematic representation of a second embodiment of the parking payment method.

FIG. 15 shows a second exemplary implementation of the payment method S100, wherein the parking identifier 41 is a QR code painted near the parking space, and the parking duration 70 is that of a start-stop session, wherein the parking option allows the user 10 to park for any amount of time up to the maximum parking duration set by the parking supplier 40. Additionally, the start condition is the verification of the user 10 and parking information 42, the end condition is the receipt of an end notification, generated from the user 10. The payment transaction is processed after the end notification is received. In this exemplary implementation, the mobile computing device 20 includes a camera, which is used by the user 10 to take a photo of the QR code, and a barcode/QR code decoder, which decodes the QR code image and extracts the embedded information. The information contained in the QR code prompts the mobile computing device 20 to send a unique parking identifier 41, contained in the QR code information, along with the saved user identifier 11 to the server 30. Upon receiving the user and parking identifiers (11 and 41, respectively), the server 30 verifies the identifiers and starts a parking session by recording a start timestamp. Throughout the duration of the parking session (before the end condition is met), the mobile computing device 20 is capable of displaying an "end session" option, wherein the "end session" option presents the user 10 with the option of ending the parking session. Upon receipt of the selection of the "end session" option, the mobile computing device 20 sends an end notification to the server 30, wherein, upon receipt of the end notification, the server 30 ends the parking session, computes the parking duration 70 from the start time 72 and the time the end notification was received, and processes a transaction between the payment provider 50 and parking supplier 40 based on the calculated parking duration 70 and pricing information.

In accordance with another aspect of the present invention, transactions associated with parking related services may be processed in conjunction with the transaction associated with a corresponding parking session, in the same or like manner as described above. For example, a parking supplier 40 may offer a variety of ancillary, parking related services. Such services may include, but are not limited to electric vehicle charging services, valet parking services, vehicle cleaning and maintenance services, and the like. As these services would, more likely than not, be offered in conjunction with a parking session, herein below, we refer to the system and method of processing a parking related service transaction together with a parking session transaction as "Parking Plus".

Another example of a parking related service is a parking space search and reservation service. Unlike the aforementioned parking related services, the parking space search and reservation service would, more likely than not, be employed prior to a parking session. However, it will be understood that making a reservation using this service, in accordance with exemplary embodiments of the present invention, may result in a parking session and the utilization of one or more ancillary parking related services in conjunction with the parking session, assuming the parking provider 40 offers any such ancillary parking related services at the parking facility where the user has made a reservation.

As stated above, one example of an ancillary parking related service that might be provided in conjunction with a parking session is an electric vehicle charging service. Thus, if user 10 is operating an electric vehicle, and wants to charge the vehicles battery while the vehicle is parked, this aspect of the present invention provides for the processing of the transaction associated with the parking session and the transaction associated with the charging of the electric vehicle.

Figure 16:
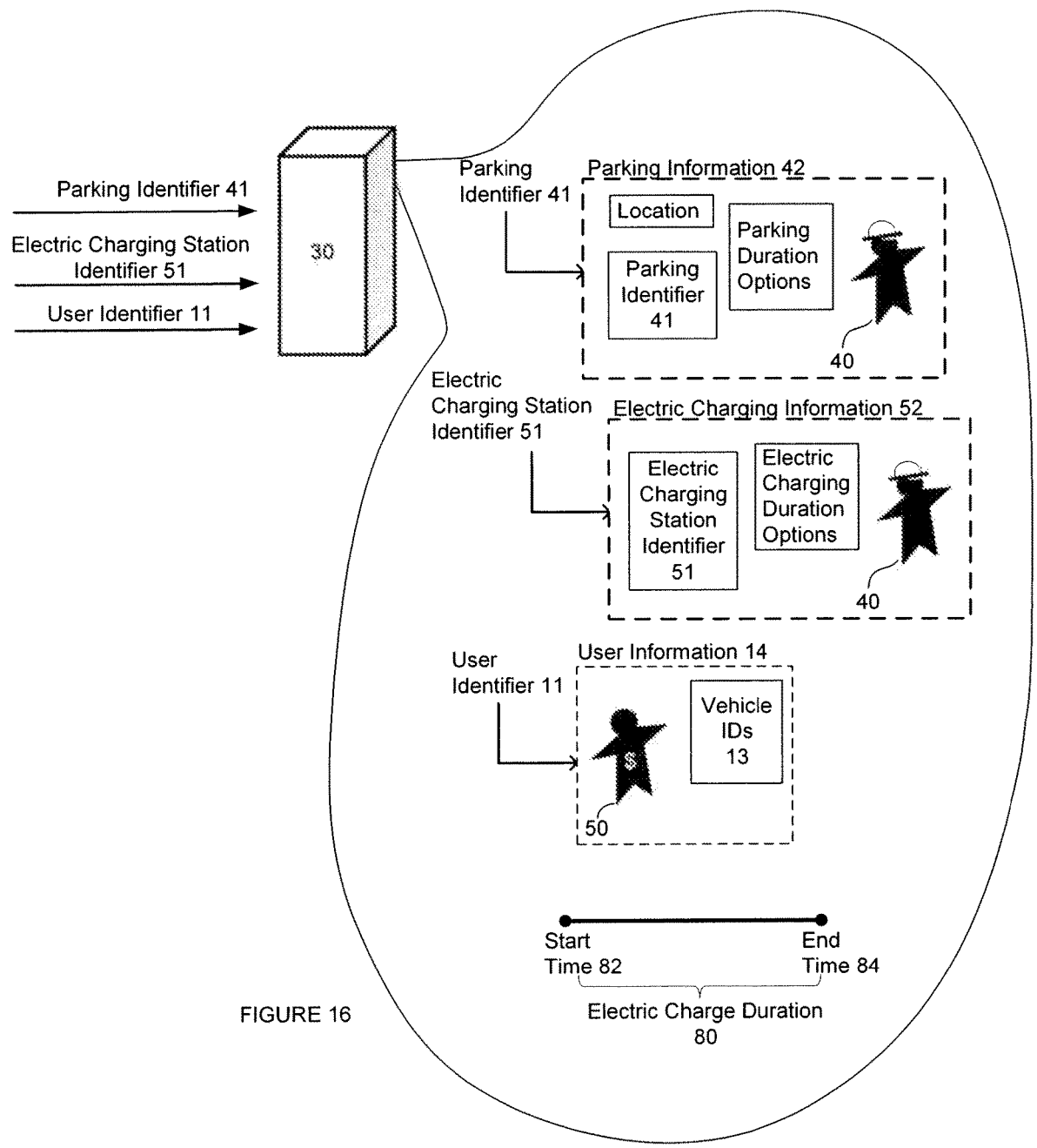
FIG. 16 illustrates the functions associated with a server, including the function of processing a transaction associated with a parking related service, such as electric vehicle charging, in accordance with exemplary embodiments of the present invention.

FIG. 16 illustrates the functions associated with server 30 including the function of processing a transaction associated with the parking related service of electric vehicle charging. FIG. 16 is similar to FIG. 3, which was discussed above in detail. As indicated in FIG. 16, the mobile computing device 20 will transmit one or more signals to server 30, where the one or more signals may convey the following information: a parking identifier 41, a user identifier 11 and an electric charging station identifier 51. As explained above, the parking identifier 41 uniquely defines the specific location, i.e., the specific parking lot or parking space within that lot, where user 10 has parked the electric vehicle. The parking identifier 41 is, of course, associated with a given parking supplier 40. The user identifier 41, as explained above, uniquely defines user 10.

The electric charging station identifier 51, which was not previously described, defines the specific electric charging station that is being employed to charge the user's electric vehicle. Thus, for example, parking supplier 40 may operate a parking facility that has 100 parking spaces, each of which has a corresponding, unique parking identifier 41. Again, the parking identifier 41 may define the entire parking lot or a corresponding one of the 100 parking spaces associated with that parking lot. In any event, of the 100 parking spaces, maybe 25 spaces have electric vehicle charging equipment, and in accordance with one exemplary embodiment of the present invention, the parking supplier 40 would provide a unique electric charging station identifier 51 for the electric charging equipment associated with each of these 25 parking spaces. In accordance with other exemplary embodiments, the electric charging station identifier 51 may be inferred from the parking identifier 41, as will be explained in greater detail below.

In order for the mobile computing device 20 to transmit a signal that conveys an electric charging station identifier 51, the electric charging station identifier 51 must be uploaded into the mobile computing device 20. This may be accomplished in a number of ways. For example, the user 10 may enter the electric charging station identifier 51 which is provided at the electric charging station. Alternatively, the mobile computing device 20 may have the ability to scan a number or code that reflects the electric charging station identifier 51. Still further, the parking provider 40 or the electric vehicle charging equipment may have the capability to upload the electric charging station identifier 51 into the mobile computing device 20 automatically, through a wireless WIFI or cellular network connection. One skilled in the art will readily understand that other methods for uploading the electric charging station identifier 51 into the mobile computing device 20 are possible.

Referring back to FIG. 16, server 30 receives the aforementioned signals from mobile computing device 20. The server 30 is then able to access parking information 42 corresponding to parking identifier 41 and user information 14 corresponding to user identifier 11, where the parking information 42 and the user information 14 is stored in memory. In general, the server 30 uses the parking information 42 to provide the user 10 with, among other things, parking duration options. The user 10 will at some point select, through his or her mobile computing device 20, one or more parking duration options in order to process the payment transaction necessary to initiate the parking session.

In the event the signal transmitted from the mobile computing device 20 to the server 30 includes an electric charge station identifier 51, server 30 may use the electric charge station identifier 51 to access electric charging information 52, as shown in FIG. 16, in much the same manner that server 30 accesses the parking information 42 based on the parking identifier 41. The electric charging information 52, stored in memory at or accessible to server 30, may include various information such as the electric charge duration options and other information (e.g., type of electric charging available, time tables, rates, maximum charging time) that are specifically associated with the parking location defined by parking identifier 41. The user 10 would of course have access to the electric charging information 52 through his or her mobile computing device 20. The user 10 will at some point select one or more electric charge duration options, through his/her mobile computing device 20, in order to process the payment transaction necessary to activate the electric vehicle charging station.

As stated above, depending on the parking supplier 40 and the given parking identifier 41, the signal transmitted from the mobile computing device 20 to the server 30 may or may not include an electric charging station identifier 51. In the event the signal does not include an electric charging station identifier 51, the electric charging information 52 stored in memory that is at or accessible to the server 30 may be inferred from or mapped in memory to the parking identifier 41.

The duration of the electric vehicle charging session 80 (herein "the electric charge duration"), like the parking session duration described above, would be defined by a start time 82 and an end time 84, as shown in FIG. 16, in accordance with exemplary embodiments of the present invention. The start time 82 would correspond to a start condition having a given time stamp (e.g., a date, hour and minute) and, likewise, the end time 84 would correspond to an end condition having a given time stamp (e.g., a date, hour and minute). The electric charge duration 80 would then be the time elapsed between the occurrence of the start condition (i.e., start time 82) and the occurrence of the end condition (i.e., end time 84). The cost associated with using the electric vehicle charging equipment would be proportional to the electric charge duration 80. Preferably, the amount of elapsed time between the start time 82 and the end time 84 could be measured or calculated at server 30, and thereafter recorded, although it would be within the scope of the present invention for the mobile computing device 20, or any other device, to perform the same function in addition to or in lieu of the server 30 performing this function.

As explained, the electric charging information 52 may include electric charging duration options. The user 10 would then be able to select a preferred electric charging duration option. A first option may be a "start duration" electric charging session. In accordance with this option, the user 10 initiates the electric charging session by selecting and thereby authorizing the server 30 to process a payment transaction for one or more electric charging time intervals. Thus, for example, if user 10 selects two electric charging time intervals, the user's mobile computing device 20 would transmit a signal back to server 30, requesting or instructing server 30 to process a payment transaction to cover the cost associated with using the electric vehicle charging equipment for two electric charging time intervals. Assuming the transaction is approved, the server 30 may transmit a signal that would cause the activation of the electric charging equipment at the parking location defined by parking identifier 41. In this example, the start condition may be the transmission of the signal from server 30 that activates the electric vehicle charging equipment. If the server 30 is measuring or calculating the electric charging duration 80, the server 30 may, at the expiration of the electric charging duration 80 transmit a second signal that causes the deactivation of the electric charging equipment at the parking location defined by parking identifier 41. Thus, the transmission of this second signal might serve as the end condition. It will be understood that the present invention contemplates the ability of the user 10 to extend the electric charging duration 80 by paying for additional electric charging time intervals.

In the example described above, the electric vehicle charging equipment is automatically activated by the signal transmitted by server 30. In an alternative embodiment, the server 30 may transmit a signal to the mobile computing device 20, wherein the signal transmitted to the mobile computing device 20 contains an electric vehicle charging equipment start code. The user might then be required to enter the code at the electric charging station in order to activate the charging equipment. In this alternative embodiment, the start condition would be the user entering the electric vehicle charging equipment start code.

The first option was referred to as a "start duration" electric charging session. A second option may be a "start-stop" electric charging session. In accordance with this exemplary option, the total electric charge duration 80 is initially undefined. The server 30, the mobile computing device 20, or other equipment, would then track, for example, through the use of a timer, the amount of time that elapses between a start time 82 and an end time 84. The end time, in this case, would be associated with one of a number of possible end conditions, such as, the end of a corresponding and simultaneous parking session, the exhaustion of an amount of money in the user's account, a maximum amount of time set by the parking supplier 40, or an indication from the electric vehicle that the battery therein is fully charge. It will be appreciated that these particular end conditions are exemplary, and other end conditions are possible. When the end condition occurs and the total electric charge duration 80 is known, the server 30 can then process the transaction.

Figure 17:
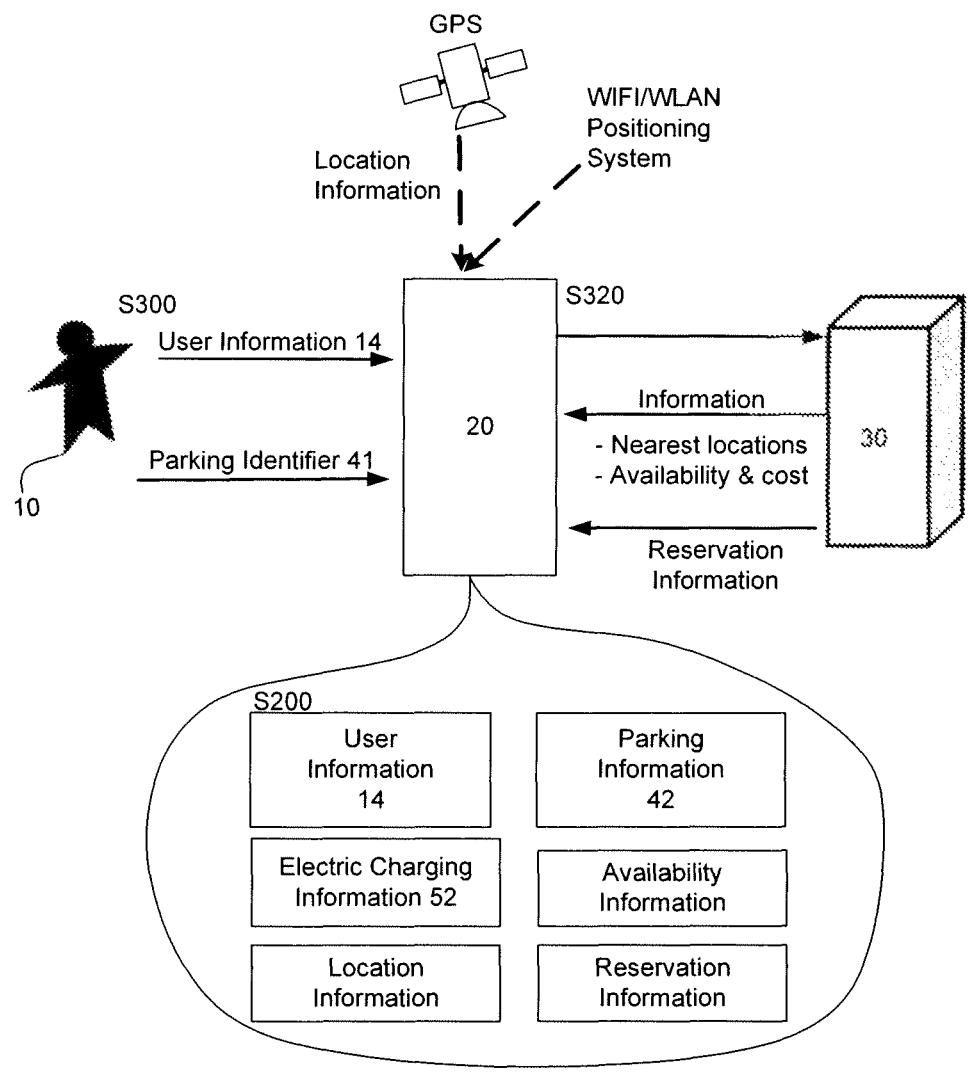
FIG. 17 is a flowchart that illustrates the processing of a payment transaction associated with an electric vehicle charging session, in accordance with exemplary embodiments of the present invention.

FIG. 17 illustrates the relationship between a mobile computing device 20, server 30 and other equipment necessary for implementing the parking space search and reservation service. As shown, mobile computing device 20 receives signals from GPS satellite and/or a WiFi/WLAN positioning system. Those signals are used to determine the location of the mobile computing device 20. The server 30 will use the location of the mobile computing device 20 to determine which available parking spaces are in proximity to the mobile computing device 20 (e.g. within a set distance from the mobile computing device). The server. More specifically, server 30 may compare the location of the mobile computing device 20 to the location of several parking facilities that currently have available spaces. The server 30 can then identify those that are closest to the mobile computing device 20, i.e., those within the set distance from the mobile computing device. A list of the closest available parking spaces may then be presented to the mobile computing device 20 so that the user can view the list and select and reserve a desired space. The parking space search and reservation service and the method of processing a payment transaction associated with this service are described in greater detail below.

Figure 18:
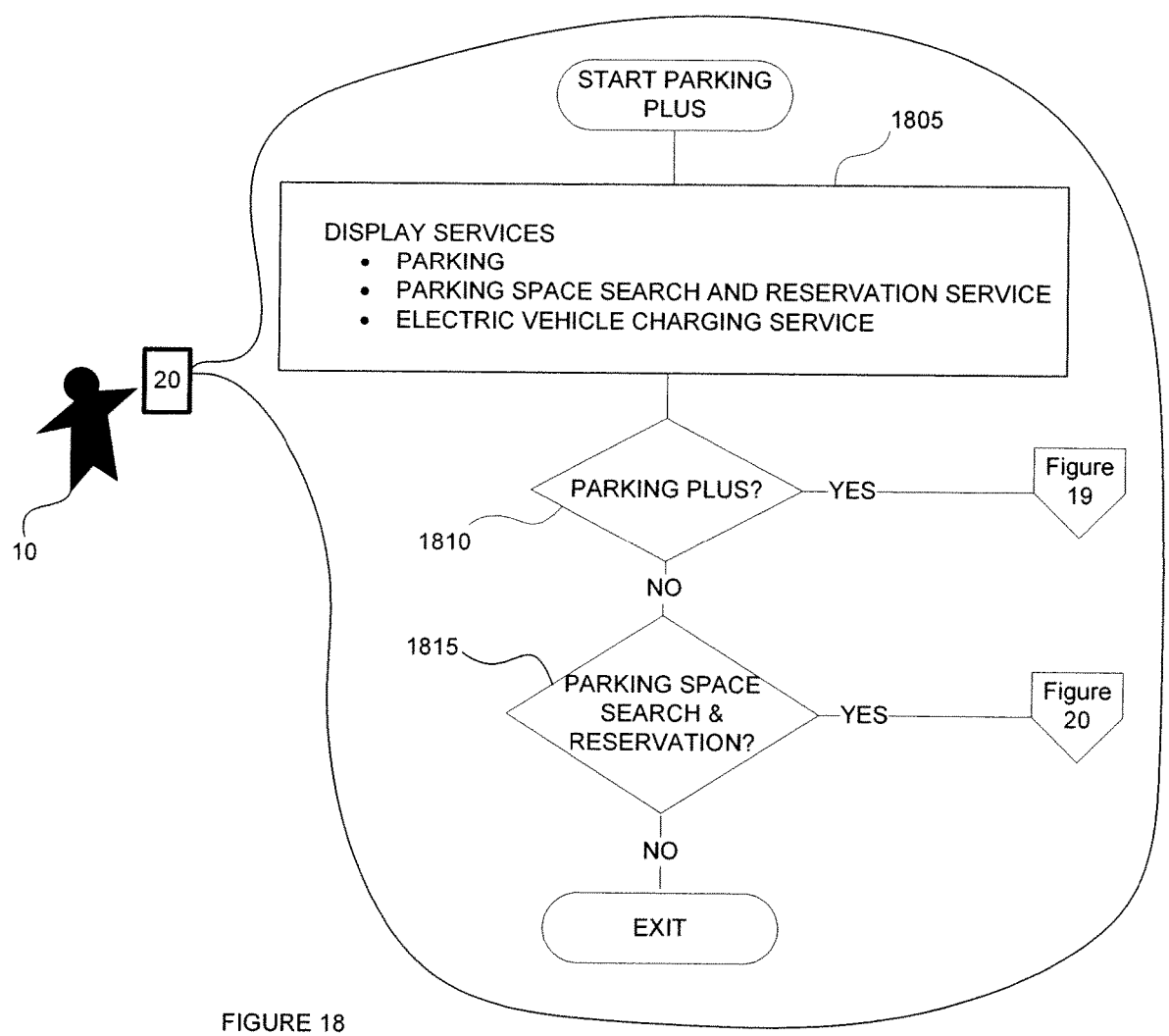
FIG. 18 is a flowchart of a method for initiating a method that involves the processing of transactions for parking, parking space reservations and other parking related services, in accordance with exemplary embodiments of the present invention.

FIG. 18 is a flowchart that illustrates a method by which user 10 may begin to employ various parking and parking related services, in accordance with exemplary embodiments of the present invention. In this example, the user 10 may begin by running an application on his or her mobile computing device 20. As shown in step 1805, the user 10 may first be presented with a list of basic features or services provided by the application. In this example, the list may be presented on the display of the user's mobile computing device 20. In FIG. 18, the display lists two exemplary services: the Parking Plus and Parking Space Search and Reservation services. It will be understood that other parking related services may be included.

Continuing on with the method presented in FIG. 18, it would then be necessary to determine if the user 10 selected either of the two exemplary services presented on the display the mobile computing device 20. For example, the method may first involve determining whether user 10 selected the Parking Plus service option, in accordance with decision step 1810. If the user 10 did select the Parking Plus service option, processing of the Parking Plus service may proceed as indicated by the YES path out of decision step 1810, and as described in detail below with respect to FIG. 19. If, on the other hand, the user 10 did not select the Parking Plus service option, as shown by the NO path out of decision step 1810, it should be determined next whether the user 10 selected the parking space search and reservation service, in accordance with decision step 1815. If it is determined that user 10 selected the parking space search and reservation service, processing of the parking space search and reservation service may proceed, as illustrated by the YES path out of decision step 1815, and as described in detail below with respect to FIG. 20. If the user 10 did not select the parking space search and reservation service, in accordance with the NO path out of decision step 1815, the application may be terminated.

Figure 19:
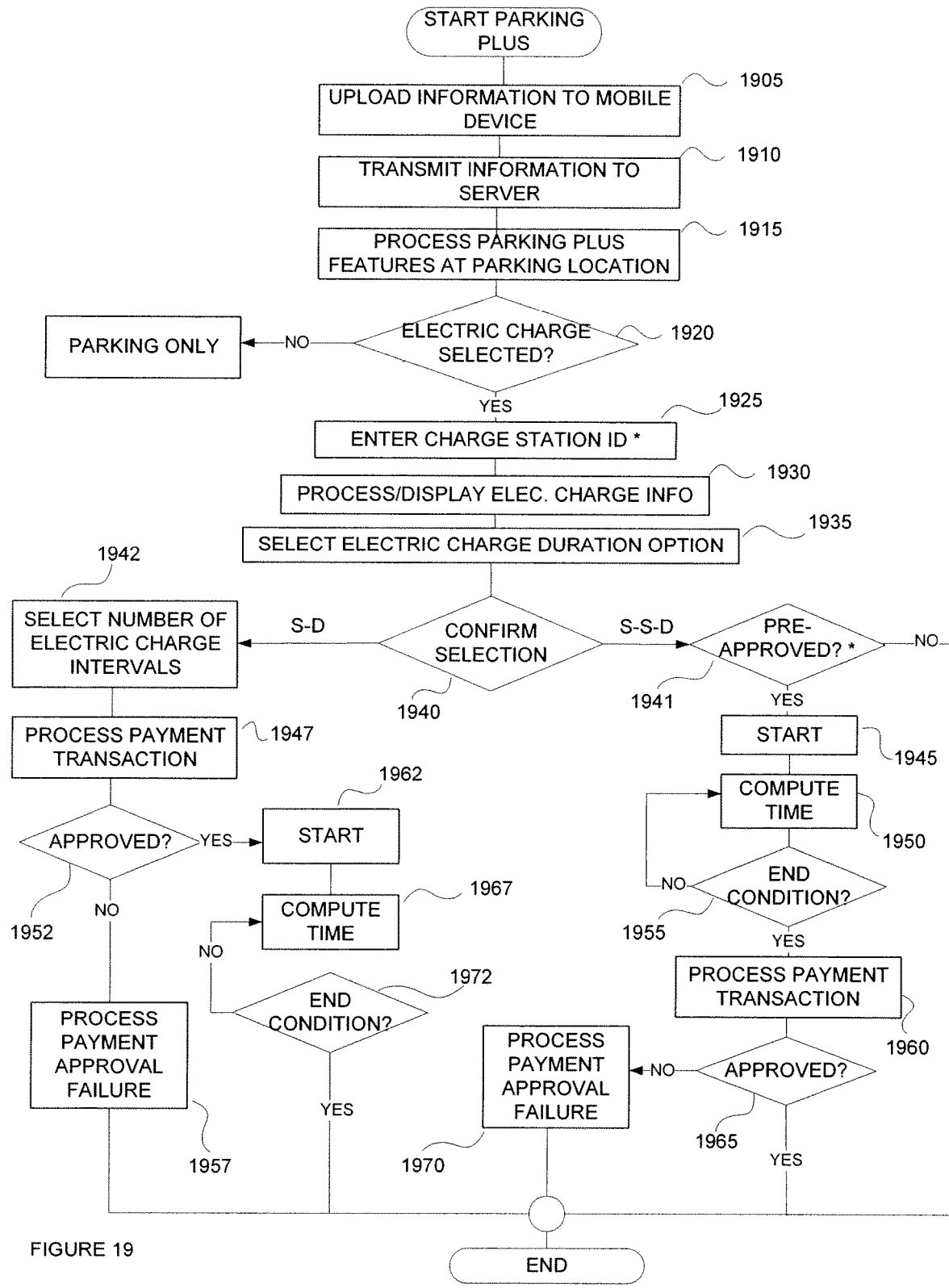
FIG. 19 is a flowchart of a method of processing a transaction for Parking Plus services, in accordance exemplary embodiments of the present invention.

FIG. 19 illustrates a method of implementing the Parking Plus service, if the user 10 selected the Parking Plus service option, as explained above, FIG. 18. It is assumed, for purposes of illustration, that the user has already arrived at the parking facility, as such, the method may first require the user 10 to upload certain information into his or her mobile computing device 20, as shown by step 1905. This information may include a parking identifier 41, which would be provided or made available to the user 10 at the parking facility. As explained above, the parking identifier 41 uniquely defines the parking location, such as the parking lot or a specific parking space at the parking lot. The information may also include a user identifier 11. As shown by step 1910, the mobile computing device 20 may then transmit a signal via one or more network connections, possibly including a WIFI/WLAN and/or the Internet, to server 30, where the transmitted signal conveys to server 30, the uploaded information.

Server 30 may then determine, as shown by step 1915, whether parking supplier 40 offers any ancillary, parking related services in conjunction with a parking session at the location defined by parking identifier 11. As explained above, such ancillary, parking related services may include, but are not limited to electric vehicle charging services, valet parking services, cleaning services, specialty kiosks, and the like. Server 30 may then transmit one or more signals to the mobile computing device 20 such that user 10 may view the ancillary, parking related services offered at the parking facility, if any. Assuming there are ancillary, parking related services available, the user would then be given an opportunity to select one or more of these services. Server 30 would then determine which, if any of the services, were selected by the user, in accordance with decision step 1920.

If user 10 chooses not to select any of the ancillary parking related services available at the parking facility, in accordance with the NO path out of decision step 1920, processing of the parking session only may proceed as described in great detail above with respect to FIGS. 1-15. If, however, user 10 does choose one or more of the ancillary parking related services, it is necessary to determine which of the services he or she selected. For ease of discussion, the flowchart of FIG. 19 illustrates the method as it relates to the user selecting the electric vehicle charging service, in accordance with the YES path out of decision step 1920.

At this point, server 30 may require that the user enter or upload onto his or her mobile computing device 20, an electric charging station identifier 51, as shown by step 1925. A signal would then be transmitted from the mobile computing device 20 to server 30 conveying the electric charging station identifier 51. The server 30 may require the identifier in order to activate the particular electric vehicle charging equipment that will be used to charge the user's vehicle. It will be noted, however, that the electric charging station identifier 51 may be part of the electric charging information 52 that is already stored in a memory at or accessible to server 30, wherein the electric charging station identifier 51 is mapped to parking identifier 41. Thus, the server 30 would be able to automatically determine the electric charging station identifier 51 once it knows the parking identifier 41.

As explained above, the electric charging information 52 may include a variety of information, including electric charging duration options associated with the specific electric vehicle charging equipment that will be used to charge the user's vehicle. As shown by step 1930, the user 10 may display on his or her mobile computing device 20, the electric charging duration options that are available. From the display, the user 10 may then select one of the electric charging duration options, as shown by step 1935. Above, two examples of electric charging duration options were described, although it will be understood that other options are possible. The first exemplary electric charging duration option was referred to as a "Start Duration" (S-D) option, and the second exemplary electric charging duration option was referred to a "Start-Stop Duration" (S-S-D) option.

In decision step 1940, a determination is made as to whether user 10 selected the Start Duration or the Start-Stop Duration option. In accordance with the "S-S-D" path out of decision step 1940, server 30 may first determine whether the user 10 is eligible to use the electric vehicle charging equipment. The server might do so by determining whether there is sufficient credit associated with the user's credit card, or whether there is a sufficient balance associated with the user's account that is maintained by server 30. If the server 30 determines there is insufficient credit or that the account balance is insufficient, server 30 may not approve the transaction, as shown by the NO path out of decision step 1941, in which case, the method may be terminated.

If, on the other hand, server 30 approves the transaction, as shown by the YES path out of decision step 1941, server 30 may transmit a signal to the electric vehicle charging station authorizing the corresponding electric charging equipment to automatically start the electric vehicle charging session, in accordance with step 1945. Alternatively, and as explained above, the server 30 may instead transmit an authorization or electric vehicle charging equipment start code to the mobile computing device 20. After which, the user 10 must then download or otherwise provide the code to the electric vehicle charging equipment in order to activate the electric vehicle charging equipment. In either event, the time stamp associated with the server 30 transmitting and the electric vehicle charging equipment receiving the signal serves as the start time for purposes of computing, by measuring or calculating, the electric charging duration 80, as shown in step 1950. It should be noted that transaction approval may not be accomplished prior to the electric vehicle charging session, but accomplished later, as indicated by decision step 1965.

The electric vehicle charging session will continue until the server 30 determines that an end condition has occurred, as shown by decision step 1955. Until that time, in accordance with the NO path out of decision step 1955, the server 30, the mobile computing device 20, or other equipment, will continue to compute the amount of time that has elapsed since the start time. Eventually, the server 30 will determine that an end condition has occurred, as indicated by the YES path out of decision step 1955. As explained above, the end condition may be met by any one of a number of conditions, including but not limited to the end of a corresponding and simultaneous parking session, the exhaustion of an amount of money in the user's account maintained by server 30, the total amount of electric vehicle charging time has reached a maximum amount of time set by the parking supplier 40, an indication from the electric vehicle that the battery therein is fully charged.

Once it has been determined that an end condition has occurred, the server 30, the mobile computing device 20, or other equipment, will be able to compute the electric charge duration 80 based on the total elapsed time according to a timer or by calculating the difference between the time stamp associated with the occurrence of the end condition and the time stamp associated with the occurrence of the start condition. The server 30 can then process the payment transaction, in accordance with step 1960, as the total cost can now be determined based on the electric charge duration 80. The server 30 must then determine if the transaction was approved, as illustrated by decision step 1965. This may involve, for example, determining if the user's credit card has sufficient credit to pay for the use of the electric vehicle charging equipment or determining if the user's account maintained by server 30 has sufficient funds to pay for the use of the electric vehicle charging equipment. If the server 30 determines that the transaction is not approved, in accordance with the NO path out of decision step 1965, the server 30 may freeze the user's account. Alternatively, server 30 may attempt to re-approve the transaction a set number of times, for example three times, as illustrated by step 1970. If after the set number of times, it is determined that the transaction is not approved, the server 30 may freeze the user's account. On the other hand, if server 30 determines that the transaction is approved and the user 10 was authorized to use the electric vehicle charging equipment, the transaction is completed. The server 30 will process the transaction in the same or like manner that it processes the transaction associated with the parking sessions. Alternatively, the transaction associated with the parking session and the transaction associated with the use of the electric vehicle charging equipment may be processed together as one transaction.

Referring back to decision step 1940, the user 10 may alternatively select the Start Duration option, in accordance with the S-D path out of decision step 1940, using his or her mobile computing device 20. Using the electric charging duration option displayed on the mobile computing device 20, the user 10 would then select the desired number of electric charging time intervals, as indicated by step 1942. For example, the user may determine that he or she would like to use the electric vehicle charging equipment for 2 hours. If the electric charging duration options indicate that the user may select any number of electric charging time intervals of 30 minutes each, up to a maximum electric charging time, user 10 would select four electric charging time intervals. The server 30 would then process the payment transaction, according to step 1947. Processing may first involve determining whether the user is approved to use the electric vehicle charging equipment for the desired amount of time, in accordance with decision step 1952. The server 30 may do this, for example, by determining whether the user's credit card has sufficient credit available to cover the cost of money using the electric vehicle charging equipment for four charging time intervals or alternatively, whether the user 10 has sufficient funds in his or her account maintained by server 30 to cover the cost associated with the four electric charging time intervals. Similar to the discussion above regarding the Start-Stop Duration option, if server 30 determines there is insufficient credit associated with the user's credit card or there are insufficient funds available in the user's account maintained by server 30, the server 30 will determine that the user is not eligible, the transaction will not be approved, and the server 30 will not authorize the activation of the electric vehicle charging equipment. In the exemplary method illustrated in FIG. 19, and in accordance with the NO path out of decision step 1952, the server 30 may then terminate the process. Alternatively, and as illustrated by step 1957, server 30 may back transmit a signal to the mobile computing device 20 prompting the user to try selecting fewer electric charging time intervals. If the server 30 again determines the transaction is disapproved, the server 30 may repeatedly give the user the option to select fewer electric charging time intervals unless and until it is determined that the user has insufficient credit or insufficient funds to cover even one electric charging time interval. Another way the server 30 may reprocess the transaction is to resubmit the payment transaction as is, and after a set number of attempts, the server 30 may terminate the transaction, and it will not activate the electric vehicle charging equipment.

If, however, server 30 determines that user 10 is eligible and, therefore, the transaction is approved, in accordance with the YES path out of decision step 1952, the server 30 will complete the payment transaction whereby user 10 will be charged for using the electric vehicle charging equipment for the selected number of electric charging time intervals (e.g., four electric charging time intervals). Again, the server 30 may process the transaction in the same or like manner that it processes the transaction associated with the parking session, or the server 30 may process the parking session and electric vehicle charging session transactions together.

Once the transaction is approved, the server 30 may transmit a signal to the electric vehicle charging station authorizing the corresponding electric charging equipment to automatically start the electric vehicle charging session, in accordance with step 1962. Alternatively, and as explained above, the server 30 may instead transmit an authorization or electric charge start code to the mobile computing device 20. After which, the user 10 must then download or otherwise provide the code to the electric charging equipment to start the electric vehicle charging session. In either event, the time stamp associated with the server 30 transmitting and the electric charging equipment receiving the signal that automatically starts the electric vehicle charging session or the user downloading the electric charge start code serves as the start time for purposes of computing, by measuring or calculating, the electric charging duration 80, as shown in step 1967.

The electric charging equipment would then continue to charge the user's vehicle, in accordance with the NO path out of decision step 1972, until it is determined that the total amount of time the user's vehicle has been charging is equal to the total time associated with the selected number electric charging time intervals. If and when it is determined that the total amount of time the user's vehicle has been charging is equal to the total time associated with the selected number electric charging time intervals, the server 30 may, according to the YES path out of decision step 1972, terminate the process. Again, it should be pointed out that computing the time, according to step 1967 may be accomplished by the server 30, the mobile computing device 20, or other equipment.

Figure 20:
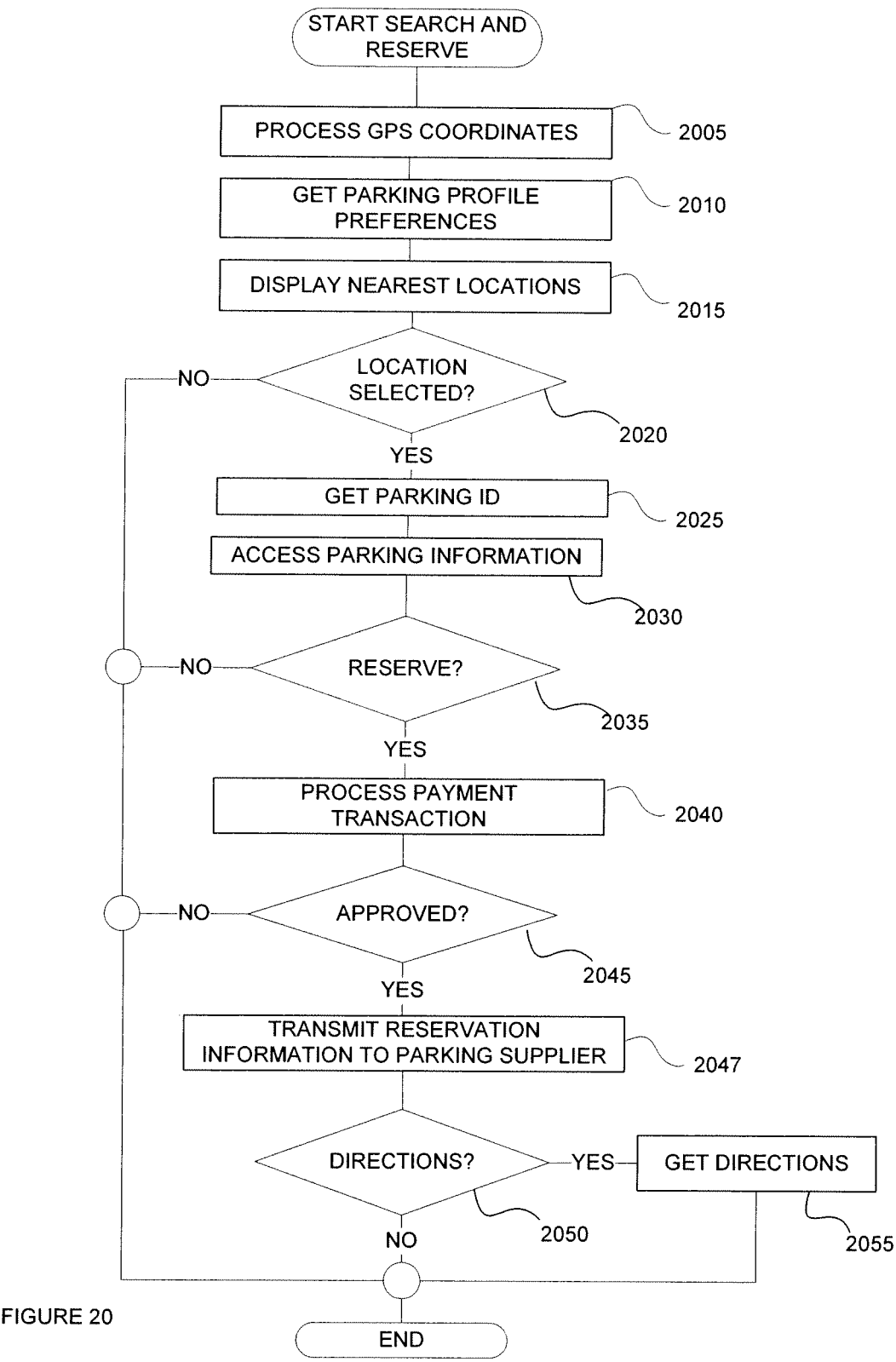
FIG. 20 is a flowchart of a method of processing a transaction for parking space search and reservation services.

FIG. 20 is a flowchart that illustrates an exemplary method of implementing the parking space search and reservation service, if the user 10 selected the parking space search and reservation service option, as explained above, with respect to FIG. 18. As shown by step 2005, the method would obtain the location of the mobile computing device 20. This may involve the mobile computing device 20 determining its GPS coordinates and then transmitting a signal to server 30 that conveys those coordinates. As shown in FIG. 17, the mobile computing device 20 may, alternatively, determine its location using a WiFi/WLAN positioning system.

In addition, user 10 might be prompted to input, through his or her mobile computing device 20, any parking preferences they may have, as shown by step 2010. For example, user 10 may prefer to locate a parking space that provides handicap access, indoor versus outdoor parking, or electric vehicle charging services. It will be understood that these preferences are exemplary, and many other parking preferences are possible. Again, the mobile computing device 20 would transmit a signal conveying the user's parking preferences to server 30. It will also be understood that the parking preference information may be conveyed to server 30 in the same signal that is used to transmit the mobile computing device location information. It should be further understood that user 10 parking preferences may be stored in memory under the user's account, or be accessible to server 30 through the user account profile associated and retrieved with the user information 14.

Server 30 would maintain and currently update a list of available parking spaces in memory, preferably mapped to a corresponding parking facility and parking provider. Server 30 would then search that list for available parking spaces that meet the user's parking preferences and are proximate to the mobile computing device location. The user 10, through the display on his or her mobile computing device 20, in accordance with step 2015, may view a listing of the closest available parking spaces or, alternatively, the user may view the closest available parking spaces on an interactive map service, such as Google Maps.

The method would then involve determining whether the user 10 has selected one of the available parking spaces, in accordance with decision step 2020. If it is determined that the user 10 did not select any of the available parking spaces, the method may be terminated, according to the NO path out of decision step 2020. However, if it is determined that the user 10 did select one of the available parking spaces, server 30 would obtain from memory the parking identifier 41 associated with the selected parking space, as shown by step 2025.

Using the parking identifier 41, server 30, as shown by step 2030, may then access various parking information 42, stored in memory, corresponding to parking identifier 41. This information may include, but is not limited to pricing information (e.g., cost per parking time interval), maximum allowed parking time, and parking space availability, in the event another has reserved the same parking space starting at a later time. Again, user 10 would be able to view this information through the display of his or her mobile computing device 20. Thereafter, the user 10 might be prompted to confirm whether they want to reserve the selected parking space and, if so, for what duration of time.

Optionally, the server 30 might invoke the functionality provided by the Parking Plus service, as described above, whereby server 30 might determine whether any ancillary, parking related services are offered by the parking provider 40 at the parking space selected by user 10. As explained above, user 10 would have an opportunity to review the ancillary, parking related services, if any, and select one or more of the services if desired. If the user 10 does select one or more of the ancillary, parking related services (e.g. electric vehicle charging service), server 30 would then take this into consideration in processing the payment transaction, as there would likely be a value added cost associated with these ancillary, parking related services.

The method would then have to determine if the user 10 did confirm a reservation, in accordance with decision step 2035. If it is determined that the user 10 did not confirm the reservation, in accordance with the NO path out of decision step 2035, the method may be terminated. If, however, it is determined that the user 10 did confirm the reservation, in accordance with the YES path out of decision step 2035, server 30 will process the corresponding payment transaction, as illustrated by step 2040, and determine whether the transaction is approved as illustrated by decision step 2045. If the transaction is not approved (e.g., there are insufficient funds in the user's account to cover the reservation), the method may attempt to re-process the transaction a set number of times, after which, the method may be terminated, in accordance with the NO path out of decision step 2045. On the other hand, if the transaction is approved, in accordance with the YES path out of decision step 2045, the server 30 may transmit a signal to the parking supplier 40, as indicated by step 2047, the signal conveying the reservation information for the selected parking space to complete the reservation.

Optionally, as shown in FIG. 20, the user 10 may be presented with the option of receiving directions from the present location of the mobile computing device 20 to the reserved parking space. The method would then have to determine if the user 10 has selected this option, in accordance with decision step 2050. If it is determined that the user 10 did not opt to receive directions, in accordance with the NO path out of decision step 2050, the server 30 may, once again, proceed with the completion of the reservation. If the user 10 does opt to receive directions, in accordance with the YES path out decision step 2050, server 30 would still complete the reservation and it may, through the use of an existing service, such as Google Maps, provide directions, as shown in step 2055, which the user will be able to view through the display on his or her mobile computing device 20.

As a person skilled in the art will recognize from the previous detailed description and from the figures and claims, modifications and changes can be made to the preferred embodiments of the invention without departing from the scope of this invention defined in the following claims.

We claim:

1. A communication network for processing a parking session, the network comprising:
   a mobile computing device interface configured for user communications between a server and a mobile computing device over a wireless network including information of a user identifier, a vehicle identifier, a parking identifier, parking session information including a user selected type of parking session, and parking duration extension options,
   wherein the type of parking session is one of a start duration parking session and a start-stop parking session, and
   wherein the start duration parking session includes a parking duration and end time;
   a communications link between the server, the mobile computing device interface, a parking supplier, and a payment provider;
   the server configured to provide, to the mobile computing device, a listing of available parking spaces within a predetermined distance set by the server to the mobile computing device location which meet a user's parking preferences;
   the server further configured to receive, from the mobile computing device, a parking location selection based on the listing of the available parking spaces to reserve a particular parking spot based on the selected parking location and associating the parking identifier to that particular parking spot;
   the server further configured to receive and process one or more signals via the communications link that reflect the user identifier, vehicle identifier, parking identifier, parking session information, wherein when the server receives the parking identifier, the server retrieves data associated with the parking identifier;
   the server further configured to transmit a signal to the mobile computing device interface via the communications link when the server determines that the data associated with the parking identifier indicates a presence of an electric charging station mapped to the parking identifier, the server displays a graphical component, on the mobile computing device interface, corresponding to the electric charging station;
   the mobile computing device configured for receiving a signal via the mobile computing device interface reflecting a parking duration extension selection, wherein the parking duration is extended, wherein a transaction between the payment provider and the parking supplier, on behalf of the user, is processed at the end of the parking duration extension and the amount associated with the transaction reflects the parking duration and the parking duration extension when the start-stop parking session type is selected and wherein the transaction between the payment provide and the parking supplier, on behalf of the user, is processed at the onset of the parking session when the start duration parking session type is selected, and wherein when the server receives an indication that a user operating the mobile computing device has requested an electric charge, the server transmits an activation signal to the electric charging station mapped to the parking identifier; and
   the electric charging station configured to begin charging in response to receiving the activation signal from the server;
   wherein the server is further configured to communicate to the mobile computing device electric charging options including an electric charger start time, an electric charger end time, and an electric charger duration, selection of any one of which controls a timing of the activation signal from the server to the electric charging station, and
   wherein at the electric charger end time or the end of the electric charger duration, the server communicates to the mobile computing device, prior to transmitting a deactivation signal to the electric charging station mapped to the parking identifier, an electric charging extension selection, activation of which delays the server transmitting the deactivation signal to the electric charger.

2. The network of claim 1, wherein the parking identifier identifies the parking supplier.

3. The network of claim 1, wherein the expiration notification comprises the imminent end of the parking session.

4. The network of claim 1, wherein the expiration notification comprises the remaining time associated with the parking session.

5. The network of claim 1, wherein the expiration notification is a push notification.

6. The network of claim 1, wherein the mobile computing device is further configured to transmit a signal reflecting a parking duration extension selection to the server via the mobile computing device interface; and
   wherein the server is configured to receive the signal reflecting the parking duration extension selection and configured to extend the parking session duration based on the parking duration extension selection.

7. The network of claim 1, wherein the vehicle identifier is one or more of a license plate number, a VIN number, a registration number, an image, a barcode, or any unique identifier of the vehicle.

8. The network of claim 1, wherein the vehicle identifier is a license plate number.

9. The network of claim 1, wherein the vehicle identifier is invisible but still detectable.

10. The network of claim 1, wherein the server further provides directions from the mobile computing device location to a selected parking location from the listing of the available parking spaces.

* * * * *